United States Patent
Luo et al.

(10) Patent No.: US 11,624,900 B2
(45) Date of Patent: Apr. 11, 2023

(54) SYSTEM FOR QUANTITATIVE DIFFERENTIAL PHASE CONTRAST MICROSCOPY WITH ISOTROPIC TRANSFER FUNCTION

(71) Applicants: NATIONAL TAIWAN UNIVERSITY, Taipei (TW); YONGLIN HEALTHCARE FOUNDATION, New Taipei (TW)

(72) Inventors: Yuan Luo, New Taipei (TW); Yu-Hsuan Chuang, New Taipei (TW); Yu-Zi Lin, New Taipei (TW)

(73) Assignees: NATIONAL TAIWAN UNIVERSITY, Taipei (TW); YONGLIN HEALTHCARE FOUNDATION, New Taipei (TW)

( * ) Notice: Subject to any disclaimer, the term of this patent is extended or adjusted under 35 U.S.C. 154(b) by 411 days.

(21) Appl. No.: 16/726,786

(22) Filed: Dec. 24, 2019

(65) Prior Publication Data

US 2021/0191099 A1   Jun. 24, 2021

(51) Int. Cl.
G02B 21/06 (2006.01)
G02B 21/00 (2006.01)
G02B 21/14 (2006.01)
G02B 21/34 (2006.01)

(52) U.S. Cl.
CPC ......... *G02B 21/14* (2013.01); *G02B 21/0052* (2013.01); *G02B 21/34* (2013.01)

(58) Field of Classification Search
CPC ............... G02B 21/00; G02B 21/0016; G02B 21/0032; G02B 21/0052; G02B 21/0056; G02B 21/0064; G02B 21/0068; G02B 21/008; G02B 21/0092; G02B 21/06; G02B 21/08; G02B 21/14; G02B 21/34; G02B 21/361; G02B 21/367; G02B 21/368
USPC .... 359/368–398, 463.1–494.1, 483.1–494.1, 359/368–389, 237–324
See application file for complete search history.

(56) References Cited

U.S. PATENT DOCUMENTS

| 8,125,713 B2 * | 2/2012 | Gluckstad | G02B 27/52 |
| | | | 359/559 |
| 2021/0311294 A1 * | 10/2021 | Hayashi | G02B 21/14 |

FOREIGN PATENT DOCUMENTS

| CN | 110388882 | * 10/2019 |
| CN | 109780993 | * 5/2021 |

* cited by examiner

*Primary Examiner* — Thong Q Nguyen
(74) *Attorney, Agent, or Firm* — ScienBiziP, P.C.

(57) ABSTRACT

A system for quantitative differential phase contrast microscopy with isotropic transfer function utilizes a modulation mechanism to create a detection light field having a radial or other axial orientation of optical intensity gradient or other distribution. A condenser generates an off-axis light field to project onto an object under examination, thereby generating an object light field, which is then guided to an image capturing device through an objective lens for capturing images. A differential phase contrast algorithm is applied to the images for obtaining a phase, thereby a depth information corresponding to the phase can be obtained to reconstruct the surface profile of the object.

4 Claims, 31 Drawing Sheets
(23 of 31 Drawing Sheet(s) Filed in Color)

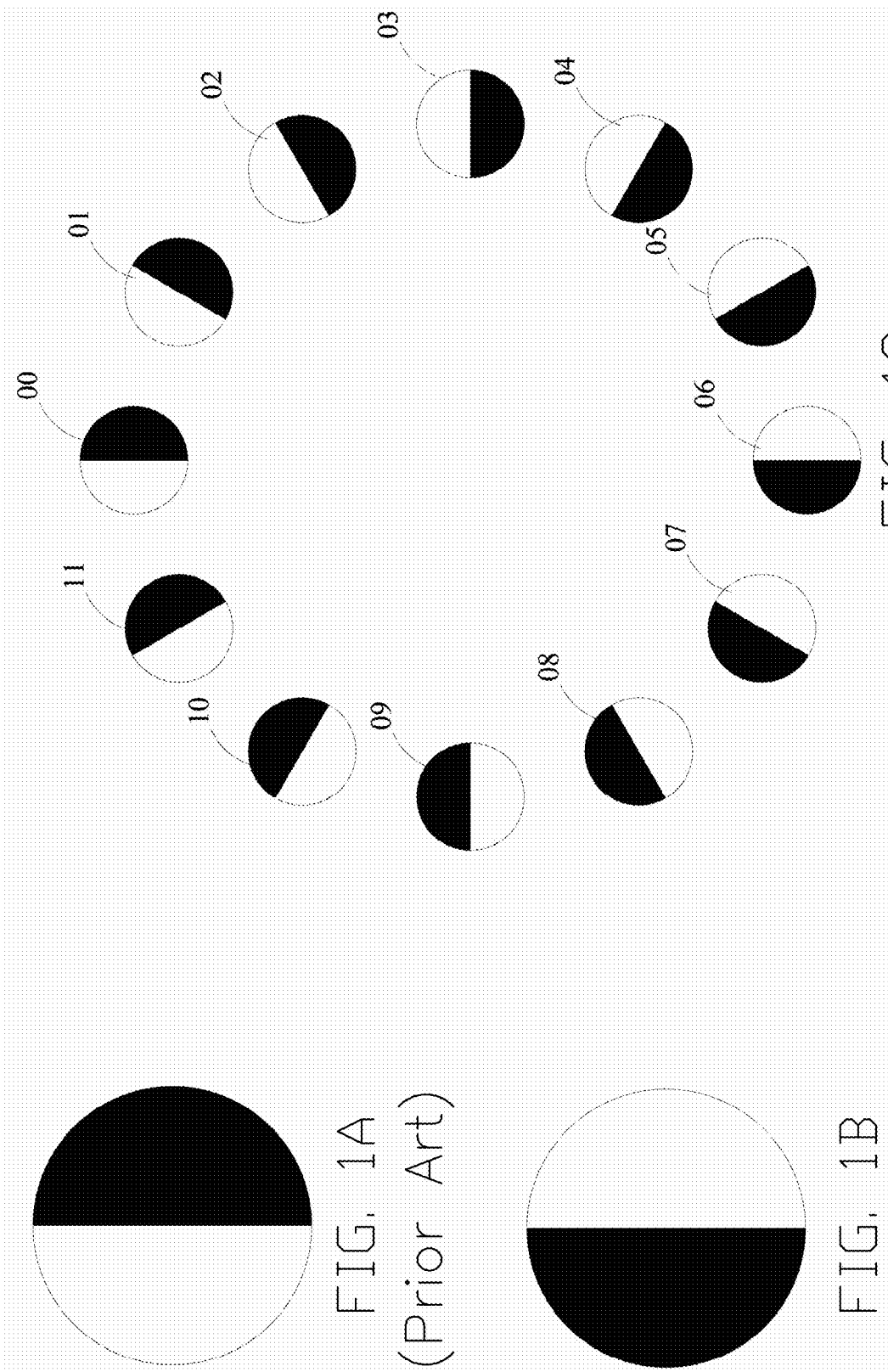

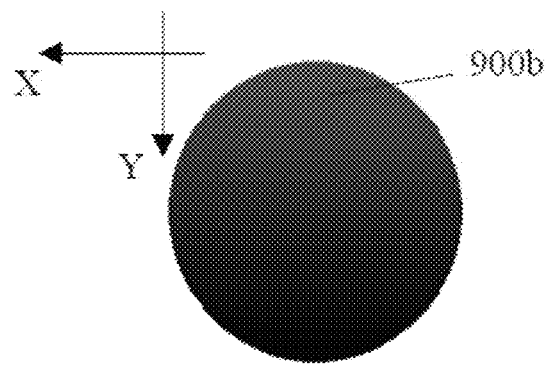 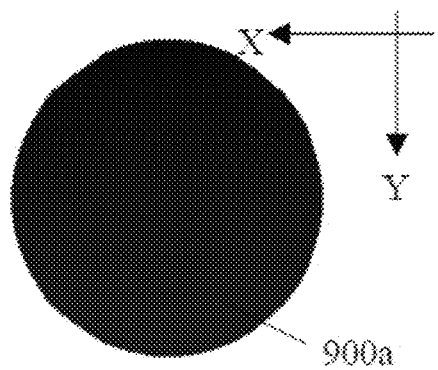
FIG. 4A FIG. 4B
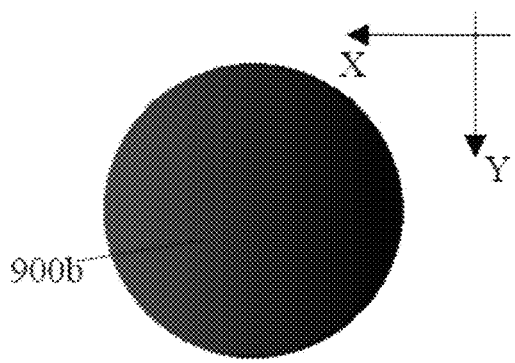 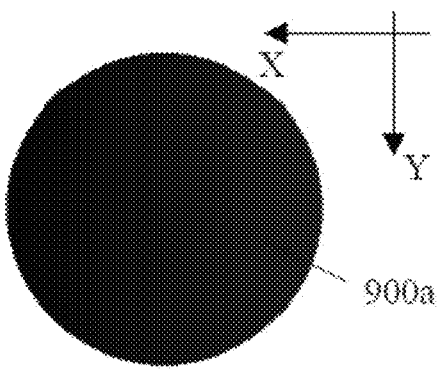
FIG. 4C FIG. 4D
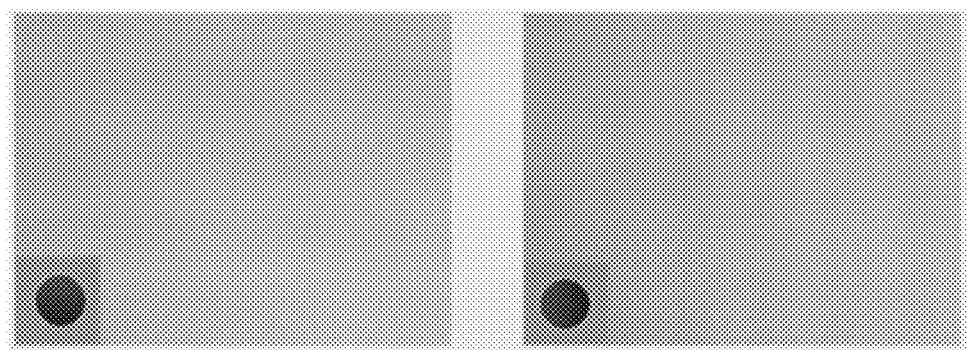
FIG. 5

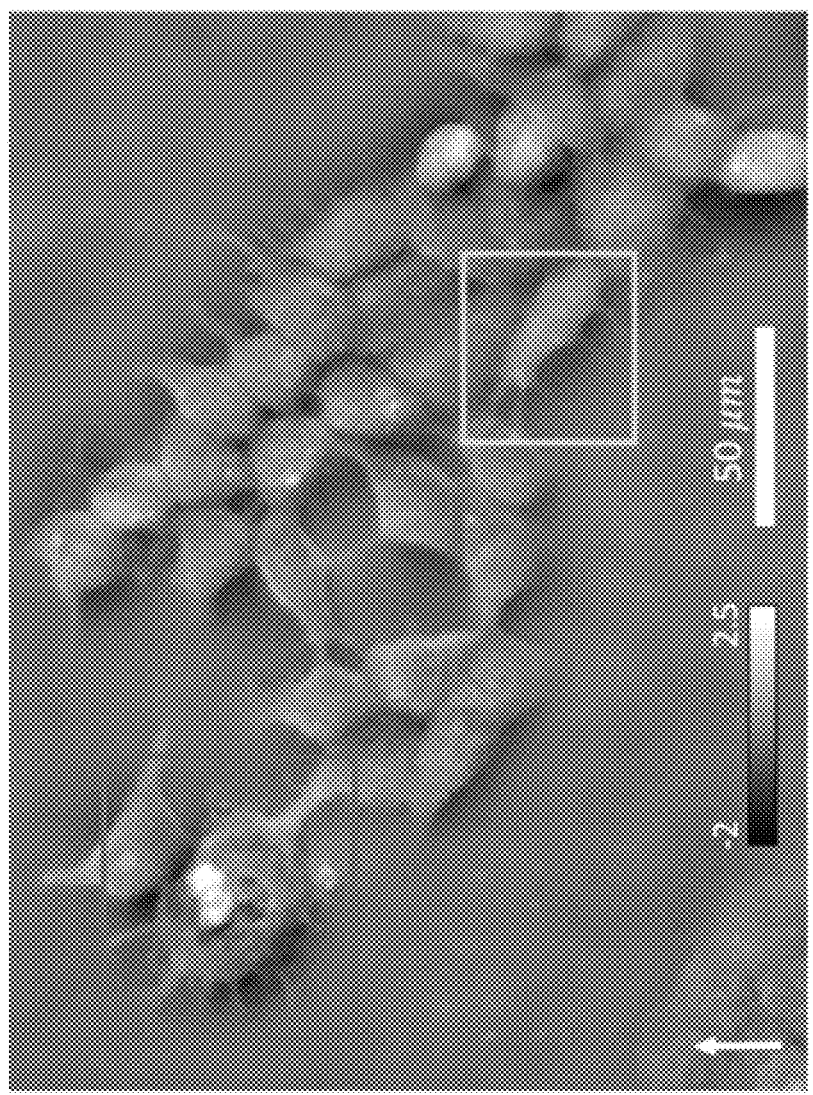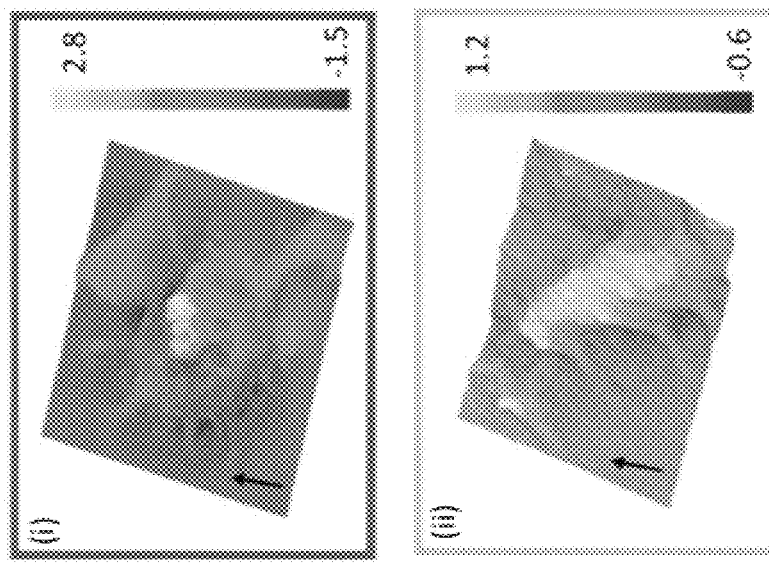
FIG. 15

SYSTEM FOR QUANTITATIVE DIFFERENTIAL PHASE CONTRAST MICROSCOPY WITH ISOTROPIC TRANSFER FUNCTION

FIELD

The subject matter herein general relates to microscopy techniques, and particularly relates to a system for quantitative differential phase contrast microscopy with isotropic transfer function, which utilizes a light field having a gradient distribution for off-axis illumination to obtain an image of an object for phase measurement.

BACKGROUND

If contrast is poor, many objects observable for biological or other scientific purpose have weak phase features, which are difficult to observe without an application of staining. In a conventional technique, these weak phase objects can be visually observed in a phase imaging system and using a spatial rate wave. However, phase measurement using a phase contrast microscopy system cannot be quantitative, because phase information in the image cannot be directly separated from intensity information. Therefore, one of the common methods for quantizing phase information measurement is to take measurements using an interference technique. However, an interference technique requires a high coherent illumination with a spot noise effect, and is limited by a spatial resolution.

Another type of quantitative phase imaging technique is a differential phase contrast (DPC) microscopy system, which produces a better resolution for solving the conventional interference shortcomings. In the conventional DPC system, a weak object transfer function is used to separate the phase information from the intensity information, and then quantize the phase information through paired images.

In a typical DPC architecture utilizing a visible light source for detection, a semicircular pattern is used to modulate the light source. The semicircular pattern, as shown in FIG. 1A, can modulate using a light intensity mask or a programmable LED array. Another method is to generate a detection light by using a spatial light modulator (SLM) or a liquid crystal panel. The SLM is positioned on a Fourier plane of an objective lens. A spectral modulation of the light intensity mask for the semicircular pattern utilizes a Hilbert transform. This Hilbert transform technique has been demonstrated to have an ability to obtain a phase having an isotropic phase contrast response, under conditions of a coherent laser illumination and setting the SLM on the Fourier plane of the objective lens.

In conventional techniques, biaxial semicircles shown in FIGS. 1A and 1B are used for measurement. However, under a partially coherent illumination, the DPC transfer function, under the semicircular light intensity mask using a vertical axis and a horizontal axis, will cause a non-isotropic transfer function due to spectrum being incomplete. To solve this problem, as shown in FIG. 1C, it is necessary to carry out the measurement using light intensity masks 00-11 for a change of twelve axial directions to increase a stability and accuracy in a phase reduction calculation. Additionally, since the semicircular light intensity mask requires a light intensity change for twelve axial directions, an efficiency of the measurement is greatly reduced, which is disadvantageous for a detection on a production line.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

The patent or application file contains a least one drawing executed in color. Copies of this patent or patent application publication with color drawing(s) will be provided by the Office upon request and payment of the necessary fee.

FIG. 1A, FIG. 1B, and FIG. 1C are schematic views of conventional light masks, which are changed with different axis directions.

FIG. 4A, FIG. 4B, FIG. 4C, and FIG. 4D are schematic diagrams showing gradient distributions of the light intensity of a first color light and a second color light along different axial directions according to the present disclosure.

FIG. 5 shows first and second optical images captured by an image capturing module.

FIG. 15 is a quantitative phase image of live breast cancer cells using MW-iDPC system.

DETAILED DESCRIPTION

Figure 2A:
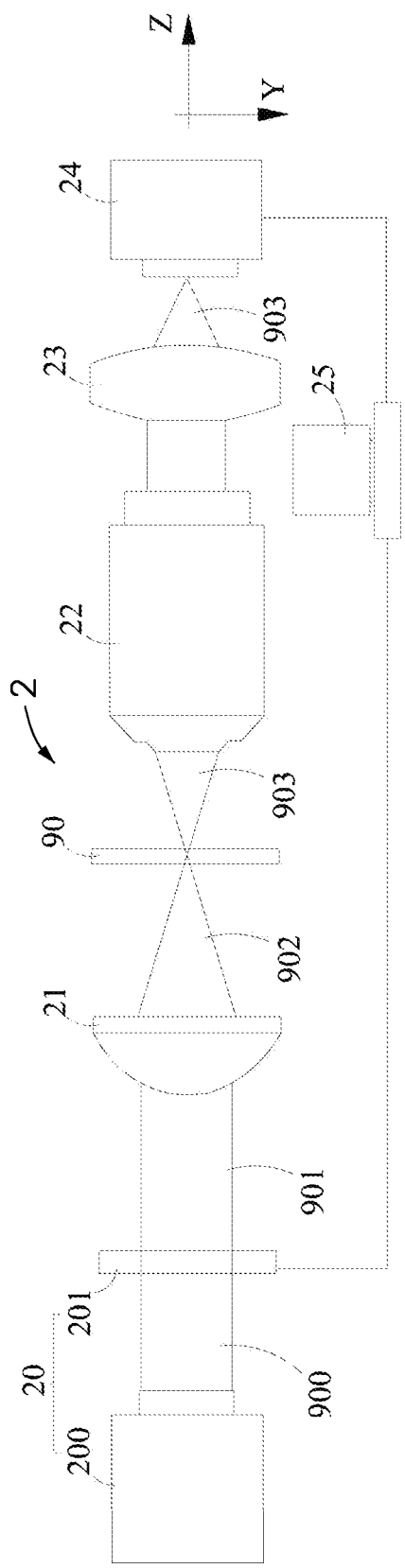
FIG. 2A is an optical architecture diagram of a system for quantitative differential phase contrast microscopy with an isotropic transfer function according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 2A illustrates an optical architecture diagram of a system for quantitative differential phase contrast microscopy with an isotropic transfer function according to an embodiment of the present disclosure. In this embodiment, the microscopy system 2 includes a light source module 20, a condenser 21, an objective lens 22, an image capturing module 24, and an operation processing unit 25. In this embodiment, the light source module 20 includes a broadband source 200 and a light intensity modulator 201. The broadband source 200 is used to generate an incident light field 900. In this embodiment, the incident light field 900 is a broadband light, for example, a white light.

The light intensity modulator 201 is located on a Fourier plane of the condenser 21. The light intensity modulator 201 is for receiving the incident light field 900 and modulating the incident light field 900 into a detection light field 901 having a plurality of color lights. The light intensity modulator 201 can be a liquid crystal module (TFT shield) for controlling a light penetration intensity or a liquid crystal on silicon (LCoS). The light intensity modulator 201 has a liquid crystal unit therein for changing an amount of light penetration and the colors of the penetration according to a controlling signal. That is, each liquid crystal being steered to correspond to different red, green, and blue filter elements is controlled by the controlling signal to determine a penetration degree of a specific color light, thereby forming the detection light field 901 having a plurality of color lights.

Figure 3A:
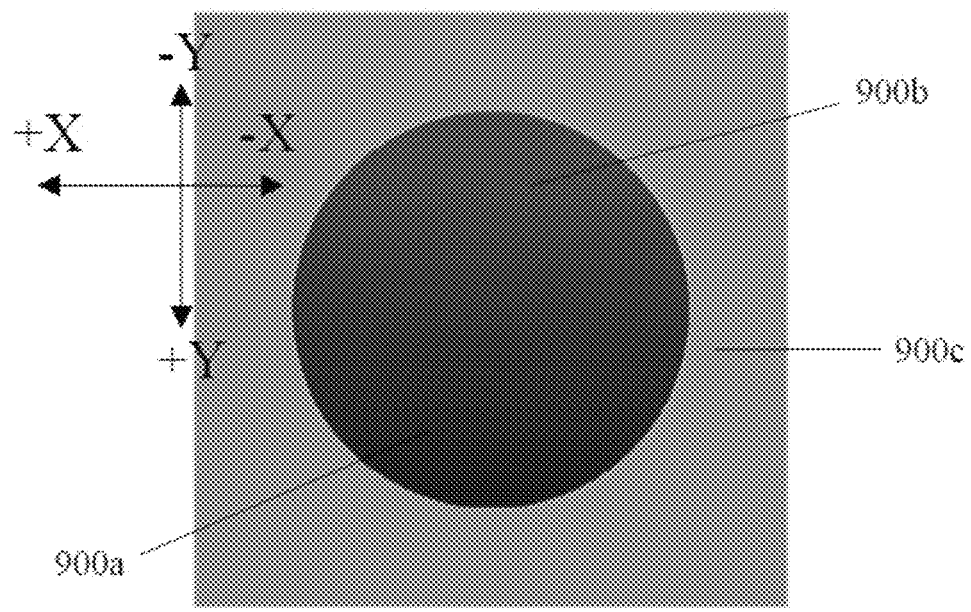
FIG. 3A, and FIG. 3B are schematic diagrams showing changes of gradient distributions of a light intensity along a first axial direction and a second axial direction according to the present disclosure.

FIG. 3A illustrates a schematic diagram after the detection light field 901 passes through the light intensity modulator 201. In this embodiment, the plurality of color lights includes a first color light 900a and a second color light 900b. In this embodiment, the first color light 900a is a blue light, the second color light 900b is a red light. In another embodiment, the first color light 900a may be a green light and the second color light 900b may be a red light, which may be determined according to a user's choice, and thus is not limited by the present disclose.

As shown in FIG. 3A, the first color light 900a is alight with a gradient distribution of increasing intensity along a first axial direction Y towards a first direction +Y. The second color light 900b is a color light with a gradient distribution of increasing intensity along the first axial direction Y towards a second direction −Y opposite to the first direction +Y. On a periphery of the first and second color lights 900a and 900b is a third color light 900c. In this embodiment, the third color light 900c is a green light. As FIG. 3A shows, the closer to below, the higher the composition of a blue light of the first color light 900a. The closer to above, the higher the composition of a red light of the first color light 900a.

Figure 3B:
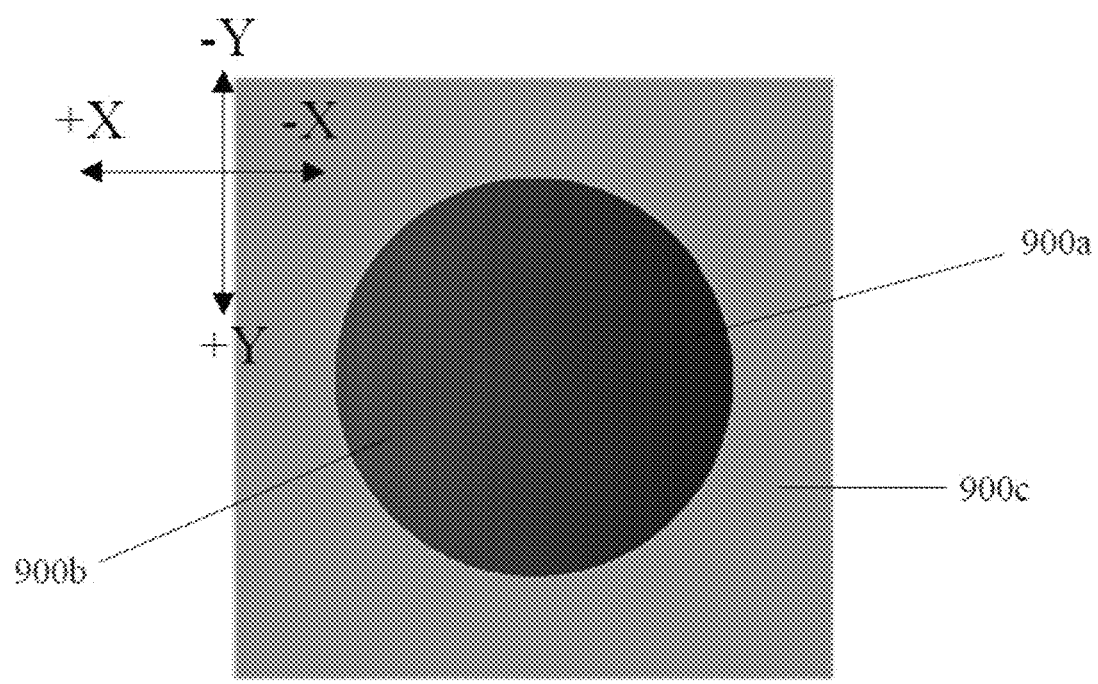

Additionally, the light intensity modulator 201 can change an orientation of the axial direction through a controlling signal, so that the direction of the gradient distribution is changed. In one embodiment, as shown in FIG. 3B, the first color light 900a is a color light having a gradient distribution of increasing intensity along a second axis X towards a first direction −X. The second color light 900b is a color light having a gradient distribution of increasing intensity along the second axis X towards a second direction +X opposite to the first direction −X. On a periphery of the first and second color lights 900a and 900b is a third color light 900c. In this embodiment, the third color light 900c is a green light. Therefore, as shown in FIG. 3B, the closer to the right-hand side, the higher is the composition of blue light of the first color light 900a, and the closer to the left-hand side, the higher is the composition of red light of the first color light 900a.

In addition, it should be noted that the orientations of the axial directions of FIGS. 3A and 3B are not limited by the XY axial directions, and may be other axial directions, for example, an axial direction having an angle with the X axis or the Y axis. It should be noted that although it is illustrated by two color lights, in another embodiment, more than two color lights may be used.

Figure 2B:
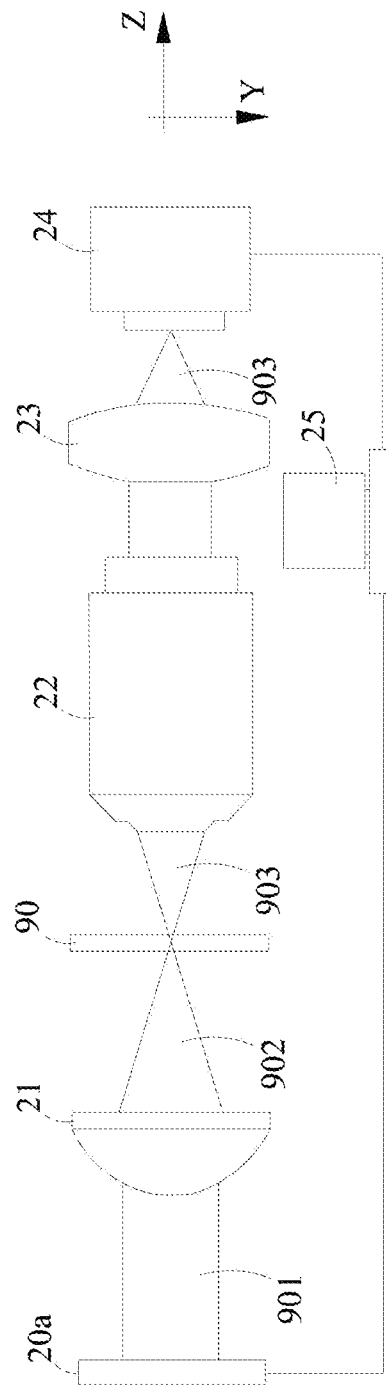
FIG. 2B is another optical architecture diagram of a system for quantitative differential phase contrast microscopy with an isotropic transfer function according to the present disclosure.

FIG. 2B illustrates another optical architecture diagram of a system for quantitative differential phase contrast microscopy with an isotropic transfer function according to an embodiment of the present disclosure. In this embodiment, FIG. 2B is substantially similar to FIG. 2A, and only differs in that the light source module 20a is an array of light emitting diodes (LED), for example, a micro-LED array. Through the controlling signal, the LED array directly generates the optical effects shown in FIG. 3A or in FIG. 3B, that is, directly generates the detection light field 901 with a plurality of color lights.

Returning to FIG. 2A, the condenser 21 is positioned on one side of the light intensity modulator 201. The condenser 21 is configured to receive the detection light field 901 modulated by the light intensity modulator 201. The light intensity modulator 201 is located on the Fourier plane of the condenser 21. The condenser 21 is configured to receive the detection light field 901. The condenser 21 further generates an off-axis light field 902 to project the light to a plurality of positions of a detectable object 90, thereby generating an object light field 903 about the detection positions.

The objective lens 22 is positioned at one side of the condenser 21, such that the object 90 is located at a focal length of the objective lens 22. The objective lens 22 receives the object light field 903 penetrating the object 90. It is to be noted that the architecture of the present disclosure can generate partially coherent illumination. In one embodiment, a condition for generating the partially coherent illumination is that the condenser 21 has a first numerical aperture (NA) value, the objective lens 22 has a second numerical aperture (NA) value, and a ratio of the first and second NA values ($NA_{condenser}/NA_{objective}$) is 1 or approximately 1. The effect of a partially coherent illumination is better than the effect of a coherent illumination of the conventional technique, such as, a resolution enhancement, increasing an optical sectioning effect, and reducing a coherent speckle noise.

The image capturing module 24 is coupled to the objective lens 22. The image capturing module 24 is configured to receive the object light field 903 to generate an optical image corresponding to the intensity gradient. In this embodiment, the image capturing module 24 is coupled to the objective lens 22 through a tube lens 23. In this embodiment, the objective lens 22 and the tubular lens 23 are structures of a microscopy system. The microscopy system may be a commercial one, for example, a Leica DMI3000 device.

It should be noted that, unlike the conventional technique for capturing an image corresponding to a light intensity mask (such as that illustrated in FIG. 1A to FIG. 1C) at one time, the present disclosure is characterized that, through the light intensity modulator 201 or the light source module 20 of the LED array, a plurality of color lights with different gradient distributions is generated. Then, one image captured by the image capturing module 24 has an image of the color light corresponding to the plurality of gradient distributions. Through appropriate color processing, an image of each color can be separated. Then, through one image capture, a plurality of images needed for differential phase contrast can be obtained. In this way, multiple images corresponding to different gradient distributions can be obtained by one shutter image acquisition, thereby saving measuring time.

For example, the detection light field of FIG. 3A is equivalent to a combination of two-color lights as shown in FIGS. 4A and 4B. Taking the detection light field of FIG. 3B as an example, it is equivalent to a combination of two-color lights as shown in FIG. 4C and FIG. 4D. Therefore, through two image captures, four images corresponding to different gradient distributions can be obtained, which saves the time required for measurement. FIGS. 4A to 4D show the gradient distributions of the light intensity of each color light. FIG. 4A corresponds to an intensity gradient of the second color light 900b along a first axial direction Y. FIG. 4B corresponds to an intensity gradient of the first color light 900a along the first axial direction Y. FIG. 4C corresponds to an intensity gradient of the second color light 900b along a second axial direction X. FIG. 4D corresponds to an intensity gradient of the first color light 900a along the second axial direction X. Through a control of the light intensity gradients, when the semicircular bright and dark mask is used in each axis measurement, a problem of an amplitude cross generated in a middle-axis is avoided.

The operation processing unit 25 is electrically connected to the light intensity modulator 201. The operation processing unit 25 is configured to generate a controlling signal to control the light intensity modulator 201 to generate a combination of color lights along different axial orientations, for example, the detection light field 901 as shown in FIGS. 3A and 3B. The operation processing unit 25 can be a computer, a server, or a workstation having an arithmetic processing capability. The operation processing unit 25 can execute an application from a storage medium to make calculations about the captured image.

In addition, the operation processing unit 25 is further electrically connected to the image capturing module 24. The operation processing unit 25 is configured to receive an optical image about the object light field captured by the image capturing module 24, operate differential phase contrast calculations to obtain a phase of each detection position on the object 90, thereby reconstructing the surface profile or internal structural features of the object 90.

Figure 6:
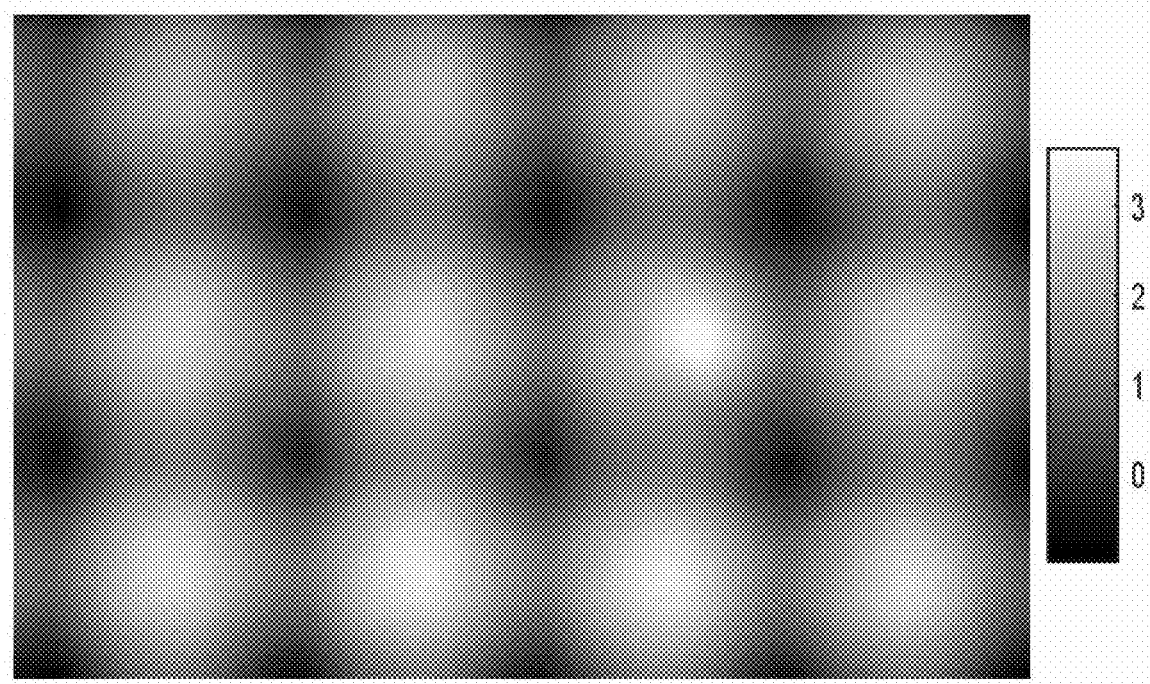
FIG. 6 is an image of distribution of phase information obtained by a multi-axis phase transfer function of the present disclosure.

In this embodiment, taking the object 90 as a micro lens array as an example, the image captured by the image capturing module 24 is as shown in FIG. 5. The operation processing unit 25 performs a color correction calculation and a color separation on the images captured by the detection light field 901 corresponding to the different combinations of colored light, to form an optical image corresponding to the different single-color light intensity gradients of FIGS. 4A to 4D. The phase information distribution image as shown in FIG. 6 is obtained by the differential phase contrast calculations. It should be noted that the manner of the color separations may be performed by the operation processing unit 25. In other embodiments, when capturing images, the image capturing module 24 may directly generate an optical image corresponding to different single-color light intensity gradients of FIGS. 4A to 4D.

Figure 7:
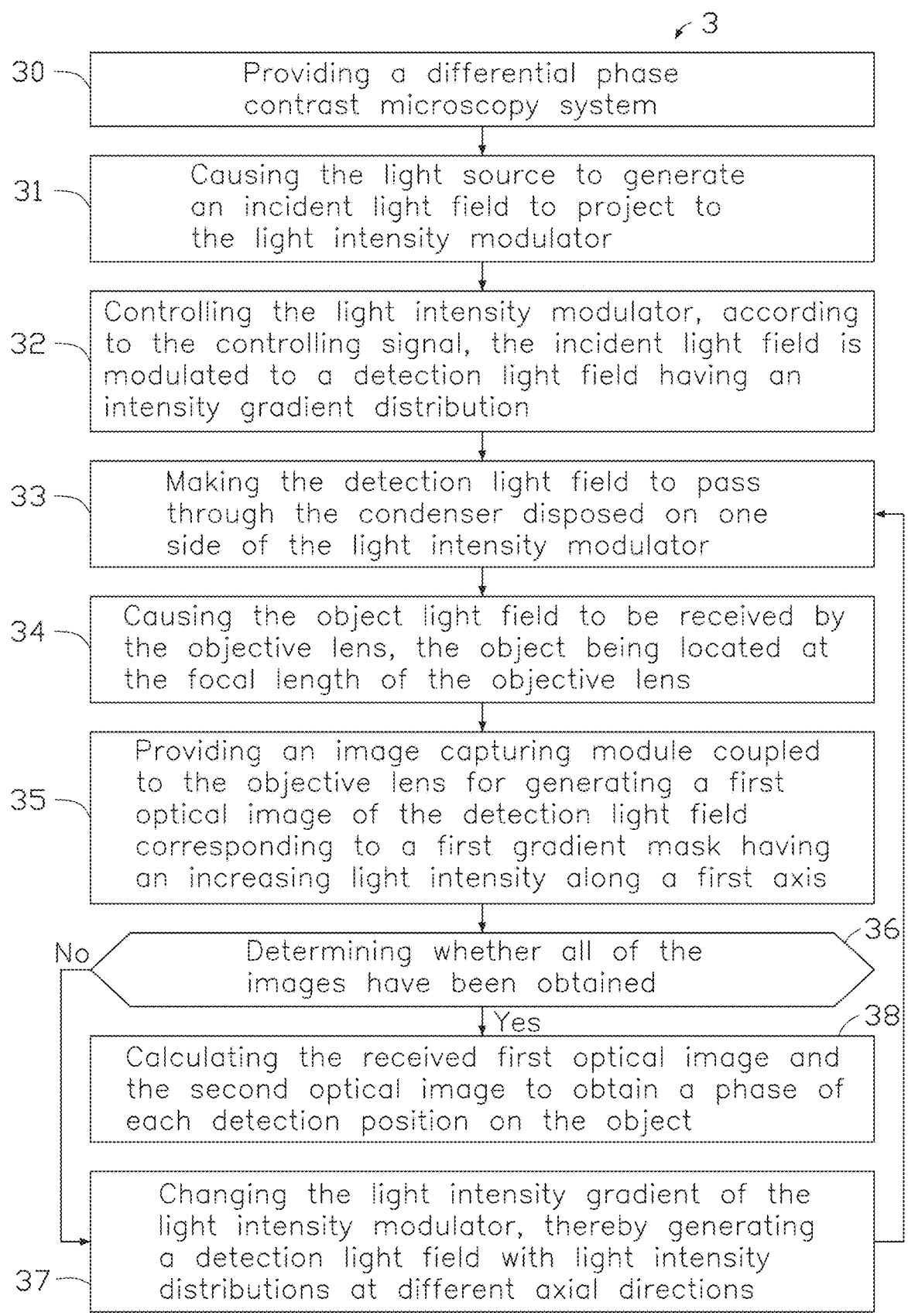
FIG. 7 is a flowchart of a method of applying differential phase contrast microscopy according to an embodiment of the present disclosure.

Referring to FIG. 2A and FIG. 7, FIG. 7 illustrates a flowchart of a differential phase contrast microscopy method according to the present disclosure. In this embodiment, the method (method 3) uses the microscopy system of FIG. 2A to perform a differential phase contrast microscopic measurement on an object surface. Firstly, step 30 is performed to provide a differential phase contrast microscopy system as shown in FIG. 2A or FIG. 2B. Next, step 31 is performed to cause the broadband light source 200 to generate an incident light field 900 projecting onto the light intensity modulator 201. Then, step 32 is performed to control the light intensity modulator 201. According to the controlling signal, the incident light field 200 is modulated to a detection light field 901 having an intensity gradient, as shown in FIG. 3A.

Next, in step 33, the detection light field 901 passes through the condenser 21 disposed on one side of the light intensity modulator 201. The light intensity modulator 201 is located on the Fourier plane of the condenser 21. The condenser 21 is configured to receive the detection light field 901 and generate an off-axis light field 902 projected onto an object 90, thereby generating an object light field 903. The object 90 may be a cell or a microstructure. In this embodiment, the object 90 is a micro lens array.

Next, step 34 is performed to cause the object light field 903 to be received by the objective lens 22. The object 90 is located at the focal length of the objective lens 22. Next, step 35 is performed to provide an image capturing module 24. The image capturing module 24 is coupled to the objective lens 22. The image capturing module 24 is configured to generate a first optical image corresponding to the light gradient of FIG. 3A, as shown in a left side diagram of FIG. 5.

Then, step 36 is performed to determine whether two images corresponding to light intensity gradients have been obtained at different axial directions. If not, step 37 is performed to change the light intensity gradient of the light intensity modulator 201, thereby generating a detection light field with light intensity distributions at different axial directions. For example, in this step 37, the operation processing unit 25 controls the light intensity modulator 201 to generate the detection light field 901 as shown in FIG. 3B. Then, it returns to step 33 and repeats the steps 33 to 35 for obtaining a second optical image of the detection light field 901, as shown in a right-side diagram of FIG. 5. It should be noted that the number of the optical images obtained corresponding to different axial directions is determined according to requirements of the calculations, one image (for example, either FIG. 3A or FIG. 3B) can be used for performing subsequent calculations, and the difference is an accuracy of the phase information.

After obtaining the first and second optical images respectively corresponding to the increasing and decreasing of the two axial gradients, step 38 is performed. The operation processing unit 25 performs an arithmetic processing analysis. The arithmetic processing analysis includes a color separation and a correction processing. The color separation and the color correction can use conventional techniques to generate the optical images corresponding to FIGS. 4A-4D. The calculation is further performed to obtain the phase of each detection position of the object 90, thereby reconstructing the surface profile or internal features of the object 90.

In this step 38, the first optical image is mainly divided into a first sub-optical image and a second sub-optical image, that is, the optical images corresponding to the light intensity gradients of FIGS. 4A and 4B. The second optical image is divided into a third sub-optical image and a fourth sub-optical image, that is, the optical images corresponding to the light intensity gradients of FIGS. 4A and 4B.

In an embodiment of a color separation and correction operation, through the red, green, and blue channels, an original white light is filtered into three separated colors, namely red (R) chromatogram, green (G) chromatogram, and blue (B) chromatogram by the first and second optical images. Each color channel will carry different image information. However, the chromatogram generated by the light intensity modulator 201 (TFT shield) may not exactly match a spectral response of a color image capturing module 24 (for example, a color camera). Due to color leakage, the light intensity of each color channel of the light intensity modulator 201 (TFT shield) affects the remaining adjacent color channels. Color leakage from different color channels severely degrades a quality of a reconstructed image. An RGB light intensity collected by the image capturing module 24 can be formulated as shown in the equation (1).

$$\begin{bmatrix} I^R_{Camera} \\ I^G_{Camera} \\ I^B_{Camera} \end{bmatrix} = T \begin{bmatrix} I^R_{TFT} \\ I^G_{TFT} \\ I^B_{TFT} \end{bmatrix} \quad \text{(equation (1))}$$

Wherein a parameter $I_{Camera}^G$ is a light intensity of the image capturing module 24. A parameter $I_{TFT}^G$ is a light intensity of the light intensity modulator 201 (TFT shield). The parameter g represents each color RGB. The spectrum is determined by the red R, green G, and the blue B channels of the image capturing module 24 and the red R, green G, and blue B channels of the TFT shield. The parameter T is a 3×3 transfer matrix, as shown in the following equation (2), which transmits the intensity of the original spectrum to the intensity received by image capturing module 24.

$$T = \begin{bmatrix} L^R_R & L^G_R & L^B_R \\ L^R_G & L^G_G & L^B_G \\ L^R_B & L^G_B & L^B_B \end{bmatrix} \quad \text{(equation (2))}$$

In equation (2), the parameter $L_w^v$ represents a ratio of color leakage from each color (RGB) channel v of the light intensity modulator 201 (i.e., TFT shield) to each color channel w of the image capturing module 24. The parameter $L_w^v$ can be obtained by experimental measurement. To restore the original image before the light passes through a filter of the image capturing module 24, an inverse matrix of T is multiplied by the intensity received from the image capturing module 24.

$$\begin{bmatrix} I^R_{TFT} \\ I^G_{TFT} \\ I^B_{TFT} \end{bmatrix} = T^{-1} \begin{bmatrix} I^R_{Camera} \\ I^G_{Camera} \\ I^B_{Camera} \end{bmatrix}. \quad \text{(equation (3))}$$

By leakage correction, a quality of the reconstructed image will be significantly improved. Because each color camera has a different spectral response, the parameters T and $T^{-1}$ will vary depending on different color image capturing module 24. Therefore, each system must measure the matrix T one time for a color leakage correction.

In an embodiment, performing the calculation to obtain the phase of each detection position of the object includes the following steps. First, performing step 370, by the first and second sub-optical images (for example, corresponding to FIG. 4A and FIG. 4B), calculating a first phase contrast image $I_{DPC}$ corresponding to the light intensity of each detection position and performing a Fourier calculation, thereby obtaining a converted first phase contrast image value $\Im(I_{DPC,i}(r))$. Wherein i=1, representing the first axial direction. The parameter r(x, y) represents each detection position (x, y). The parameter $I_{DPC}$ is as shown in the following formula (formula (1)).

$$I_{DPC}=(I_1-I_2)/(I_1+I_2). \quad (1)$$

In this step, the parameter $I_1$ in the formula (1) is the light intensity value of the first sub-optical image corresponding to each detection position. The parameter $I_2$ is the light intensity value of the second sub-optical image corresponding to each detection position.

Next, in step 371, by the third and fourth sub-optical images (for example, corresponding to FIG. 4C and FIG. 4D), calculating a second phase contrast image $I_{DPC}$ corresponding to the light intensity of each detection position and performing a Fourier calculation, thereby obtaining a converted second phase contrast image value $\Im(I_{DPC,i}(r))$. Wherein i=2, representing the second axis Y. The parameter r(x, y) represents each detection position (x, y). The parameter $I_{DPC}$ is as shown in the above formula (1).

In this step, the parameter $I_1$ in the formula (1) is a light intensity value of the third sub-optical image corresponding to each detection position. The parameter $I_2$ is a light intensity value of the fourth sub-optical image corresponding to each detection position.

Then, step 372 is performed to calculate a first inner product of the converted first phase contrast image value $\Im(I_{DPC,i}(r))$, i=1 and a first transfer function $H_{DPC,i}$, i=1, a second inner product of the converted second phase contrast image value $\Im(I_{DPC,i}(r))$, i=2 and a second transfer function $H_{DPC,i}$, i=2, and a sum of the first and second inner products. The parameter $H_{DPC,i}$ is as shown in the following formula (formula (2)). A sum of processes of the step 372 is as shown in the following formula (formula (3)).

$$\tilde{H}_{DPC}(u) = [\tilde{H}_{p,1}(u) - \tilde{H}_{p,2}(u)]/2\tilde{I}_0 \quad (2)$$

$$\sum_i H_{DPC,i} \cdot \Im(I_{DPC,i}(r)) \quad (3)$$

Where the parameters $H_{p,1}(u)$ and $H_{p,2}(u)$ are a pair of images about each axial direction, respectively. The parameter $\tilde{I}_0$ is a background of the light field, for example, the phase transfer function (pTF) of a S(u) of the first and second images, or the third and fourth images, which is corresponding to each mask. The parameter S(u) is defined in the following formula (formula (4)).

$$S(u)=m(u)circ(u/\rho_c) \quad (4)$$

Wherein the parameter $u=(u_x, u_y)$ is defined as spatial frequency coordinates. The parameter m(u) is a function $\rho_c=NA_{condenser}/\lambda$ of the mask generated by the light intensity modulator 21. Wherein the parameter $NA_{condenser}$ represents the numerical aperture value of the condenser 22.

The parameter λ is an operating wavelength of the incident light field. The parameter circ(ξ) is defined in the following formula (formula (5)).

$$circ(\zeta) = \begin{cases} 1, & |\zeta| \le 1 \\ 0, & |\zeta| > 1 \end{cases}. \quad (5)$$

Figure 6A:
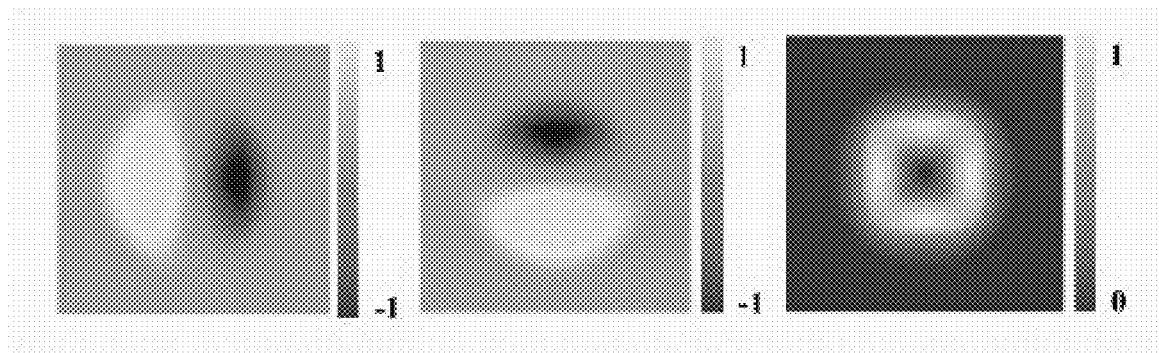
FIG. 6A is a simulation diagram of a phase transfer function, which is formed by a conventional differential phase contrast microscopy system using a biaxial semicircular mask.
Figure 6B:
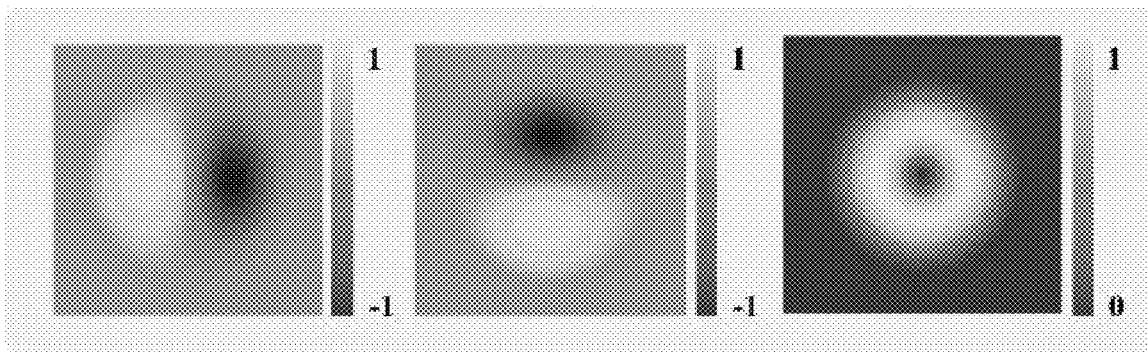
FIG. 6B is a simulation diagram of a phase transfer function, which is formed by a differential phase contrast microscopy system of the present disclosure using a mask having a biaxial gradient distribution.
Figure 6C:
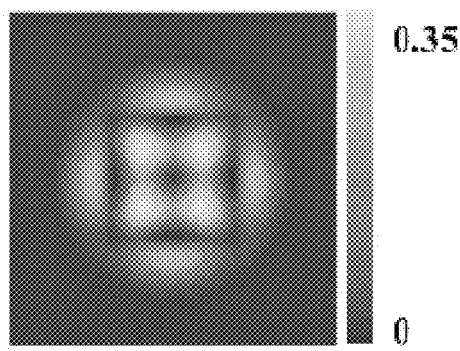
FIG. 6C is a result of subtraction of an intensity of the conventional phase transfer function from an intensity of the phase transfer function of the present disclosure.

Referring to FIG. 6A to FIG. 6C, FIG. 6A is a simulation diagram of a phase transfer function, which is formed by a conventional differential phase contrast microscopy system using a biaxial semicircular mask. FIG. 6B is a simulation diagram of a phase transfer function, which is formed by a differential phase contrast microscopy system of the present disclosure using a mask having a biaxial gradient distribution. FIG. 6C is a result of subtraction of an intensity of the conventional phase transfer function and an intensity of the phase transfer function of the present disclosure.

In FIG. 6B, the first diagram represents a phase transfer function image of a horizontal axis (corresponding to the transfer functions of FIGS. 4C and 4D). The second diagram represents the phase transfer function image of a vertical axis (corresponding to the transfer functions of FIGS. 4A and 4B). The third diagram represents the phase transfer function image of the two axes. As can be seen from the phase transfer function image of the two axes in FIGS. 6A and 6B, the intensity of the transfer function in FIG. 6A exhibits a non-isotropic result. The intensity of the transfer function of the present disclosure appears, under a partially coherent illumination, a transfer function image with isotropic characteristics evenly distributed like a donut. Therefore, the present disclosure reduces the coherent spot noise and strengthens the analysis degree by using the transfer function image generated by the mask with the intensity gradient change.

Next, in step 373, a square sum of the first transfer function and the second transfer function is added to a noise suppression function to resolve the following formula (formula (6)).

$$\sum_i |H_{iDPC,i}|^2 + \eta(\alpha \times \Im(|\nabla_\perp|^2) + \beta \times W(u)^2) \quad (6)$$

Wherein the parameter $\eta(\alpha \times \Im(|\nabla_\perp|^2) + \beta \times W(u)^2)$ represents the noise suppression function and further includes a high frequency suppression function $:\alpha \times \Im(|\nabla_\perp|)^2)$ and a low-frequency suppression function $\beta \times W(u)^2$. The parameter $\nabla_\perp$ is a first-order differential operator along the vertical axis and the horizontal axis. The parameter $\tilde{W}(u)=\exp(-u^2/\sigma_w^2)$ represents a scaling function. The scaling function is used to suppress the low frequency noise. The parameter $\sigma_w$ is a standard deviation. The parameters η, α, and β are adjustment parameters, and in one embodiment, they are 1, $10^{-2}$-$10^{-3}$, and $10^{-3}$-$10^{-4}$, respectively.

Then, step 374 is performed to divide the sum of step (c) by the value obtained by adding the step (d). And finally step 375 is performed, and the following formula (formula (7)) gives the result of step (e). The result is Fourier inverse transformed to obtain a phase corresponding to each detection position. After obtaining the phase of each detection position, the features of the object can be restored according to the phase value, for example, the surface profile.

$$\phi(r) = \Im^{-1}\left\{\frac{\sum_i H_{iDPC,i} \times \Im(I_{iDPC,i}(r))}{\sum_i |H_{iDPC,i}|^2 + \eta(\alpha \times \Im(|\nabla_\perp|^2) + \beta \times W(u)^2)}\right\} \quad (7)$$

The following formula (formula (8)) illustrates differences from a traditional analytical method. In formula (8), the parameter $H_{DPC,i}$ represents the transfer function. The parameter $I_{DPC,i}(r)$ represents the phase contrast image of each axis. The parameter represents a Fourier transform calculus.

$$\phi(r) = \Im^{-1}\left\{\frac{\sum_i H_{DPC,i} \cdot \Im(I_{DPC,i}(r))}{\sum_i |H_{DPC,i}|^2 + \gamma}\right\}. \quad (8)$$

In the conventional phase reduction equation, the present disclosure further adjusts the constant $\gamma$ to $\eta(\alpha \times \Im(|\nabla_\perp|^2) + \beta \times W(u)^2)$. The obtained biaxial images (first and second images, third and fourth images) of the present disclosure are performed by a noise processing of high and low frequencies, thereby improving the resolution of the phase reduction. After obtaining the phase information (r) of each position, the corresponding depth information can be restored according to the phase information. The relationship between phase information and depth information is well known to one skilled in the art and is not described herein.

In the foregoing embodiment, the color light combination having the intensity gradient is used to detect the object, and then a phase reduction calculation is performed. In addition to the foregoing, in another embodiment, at least one modulation pattern, which has a varied optical amplitude gradient and is generated by the optical system, can be used to generate white light or a single-color light for projection onto the object.

Figure 8:
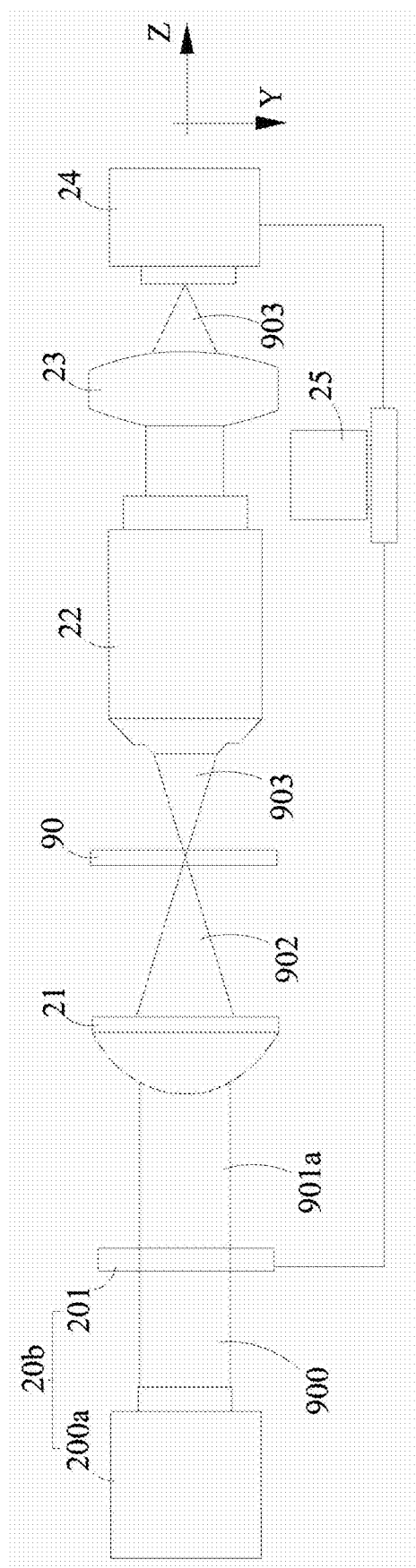
FIG. 8 is another optical architecture diagram of a system for quantitative differential phase contrast microscopy with an isotropic transfer function according to the present disclosure.

FIG. 8 is a schematic diagram of another embodiment of the quantitative differential phase contrast microscopy system with an isotropic transfer function of the present disclosure. Similar to FIG. 2A, the system includes a light source module 20b, a condenser 21, an objective lens 22, and an image capturing module 24. The light source module 20b includes a light source 200a and a light intensity modulator 201. The light source 200a is a broadband visible light source, such as, a white light source, but is not limited thereto. For example, a monochromatic visible light source can also be implemented.

The light intensity modulator 201 is disposed on one side of the light source 200a. According to the controlling signal, the light intensity modulator 201 generates a modulation pattern that modulates a light intensity gradients of the incident light field 900. In the architecture of the embodiment, the difference from the foregoing architecture is that, in this embodiment, the light intensity modulator 201 is used to generate at least one modulation pattern having a varied optical amplitude gradient along the radial direction to modulate the incident light field 900. Then the incident light field 900 forms a detection light field 901a. The detection light field 901a is different from the detected light field 901 in that the detection light field 901 is formed by the light intensity modulator 201 controlling the steering degree of liquid crystal corresponding to different filters (RGB), to form a plurality of color lights. Therefore, the spectrum of the detection light field 901 and the spectrum of the incident light field 901 are been different under the liquid crystals of different filters (RGB), thereby forming the detection light field 901 with various combinations of color lights. The spectrum of the detection light field 901a and the spectrum of the incident light field 900 in FIG. 8 are the same. Therefore, if the light source 200a generates a white light field, the detection light field 901a is also white light. Similarly, if the light source 200 generates a single-color light, the detection light field 901a is also the single-color light.

It is to be noted that the at least one modulation pattern includes a first varied optical amplitude gradient modulation pattern and a second varied optical amplitude gradient modulation pattern having at least one axial direction being symmetrical. In one embodiment, as FIGS. 9A-9F show, different modulation patterns can be generated by the light intensity modulator.

Figure 9A:
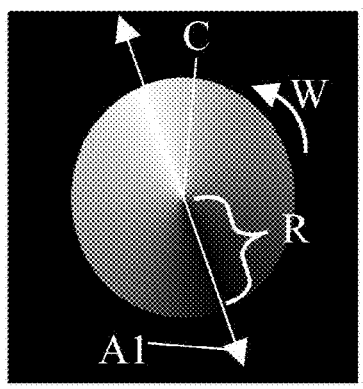
FIG. 9A, FIG. 9B, FIG. 9C, FIG. 9D, FIG. 9E, and FIG. 9F are schematic diagrams showing different modulation patterns generated by a light intensity modulator.

The radial direction having a means of varied optical amplitude gradient, centered on the optical axis of the incident light field with a radius of a specific length and along a radial of the light intensity modulator, to generate the modulation pattern having varied optical amplitude gradient. As shown in FIG. 9A, an optical axis C of the incident light field is the center of the modulation pattern. The specific length R is a radius. The varied optical amplitude gradient is modulated along the radial direction W. The axial direction A1 is a direction having an angle with the horizontal axis.

Figure 9B:
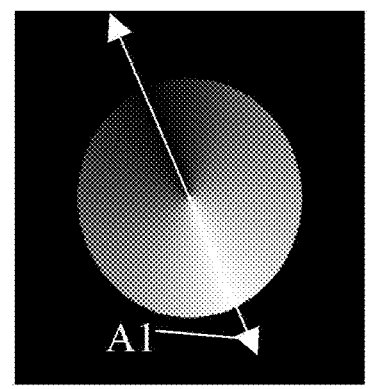

In FIG. 9A, with the axial direction A1 as the boundary, the gradient variation of the right half is seen to be stronger in a counterclockwise direction. The gradient variation of the left half is weaker in a counterclockwise direction. As shown in FIG. 9B, the axial direction A1 is the same as that of FIG. 9A, the difference is that the modulation direction of the light amplitude gradient variation is opposite to that of FIG. 9A.

Figure 9C:
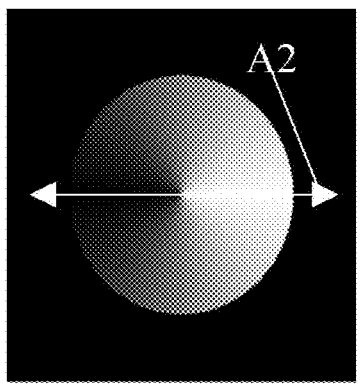
Figure 9D:
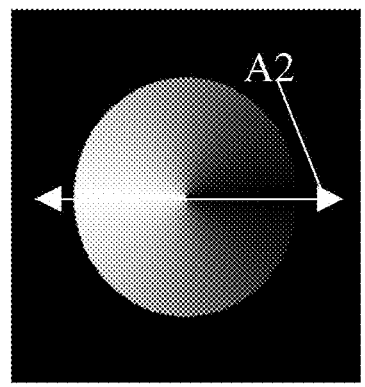
Figure 9E:
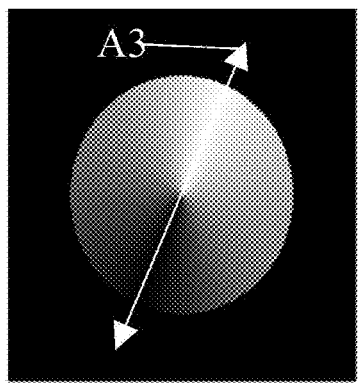
Figure 9F:
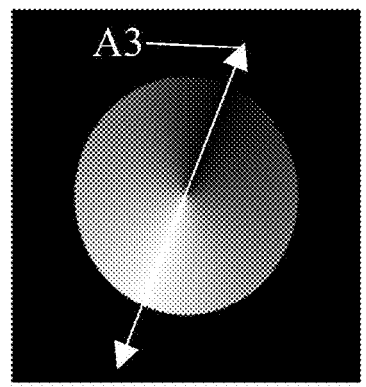

FIGS. 9C and 9D are substantially similar to FIGS. 9A and 9B, and show the differences as the axial direction A2 being in the horizontal direction. In FIG. 9C, with the axial direction A2 as the boundary, the gradient variation of the upper half is seen to be weaker in the counterclockwise direction. The gradient variation of the lower half is stronger in the counterclockwise direction. The gradient variation in FIG. 9D is opposite to that of FIG. 9C. As shown in FIG. 9E and FIG. 9F, which are substantially similar to FIGS. 9A and 9B, the difference is in the axial direction A3. In FIG. 9E, with the axial direction A3 as the boundary, the gradient variation of the right half is stronger in the counterclockwise direction. The gradient variation in the left half is weaker in the counterclockwise direction. The gradient variation in FIG. 9F is opposite to that of FIG. 9E.

Returning to FIG. 8, the condenser 21 is disposed on one side of the light intensity modulator 201. Then the light intensity modulator 201 is located on the Fourier plane of the condenser 21. The condenser 21 is configured to receive the detection light field 901a and generate an off-axis light field 902 to project onto an object 90, thereby generating an object light field 903. The objective lens 22 is disposed on one side of the condenser 21, such that the object 90 is located at a focal length of the objective lens 22 and the objective lens 22 receives the object light field 903. The image capturing module 24 is coupled to the objective lens 22 for receiving the object light field 903 to generate an optical image corresponding to the varied optical amplitude gradient.

As shown in FIG. 9A to FIG. 9F, after the light intensity modulation module 201 is modulated by the operation processing unit 25 into the pattern of FIG. 9A, the image capturing module 24 generates an image. Then, the operation processing unit 25 sequentially controls the light intensity modulator 201 to modulate the modulation patterns of FIGS. 9B to 9F, so that the image capturing module 24 captures the modulated optical images.

After the operation processing unit 25 captures six optical images corresponding to FIGS. 9A to 9F, the optical images corresponding to the modulation patterns of FIGS. 9A and 9B are grouped. The optical images corresponding to the modulation patterns of FIGS. 9C and 9D are grouped, the optical images corresponding to the modulation patterns of FIGS. 9E and 9F are grouped, and then the differential phase contrast calculation is performed. The algorithm is as shown in the above formulas (1)-(7).

Figure 10:
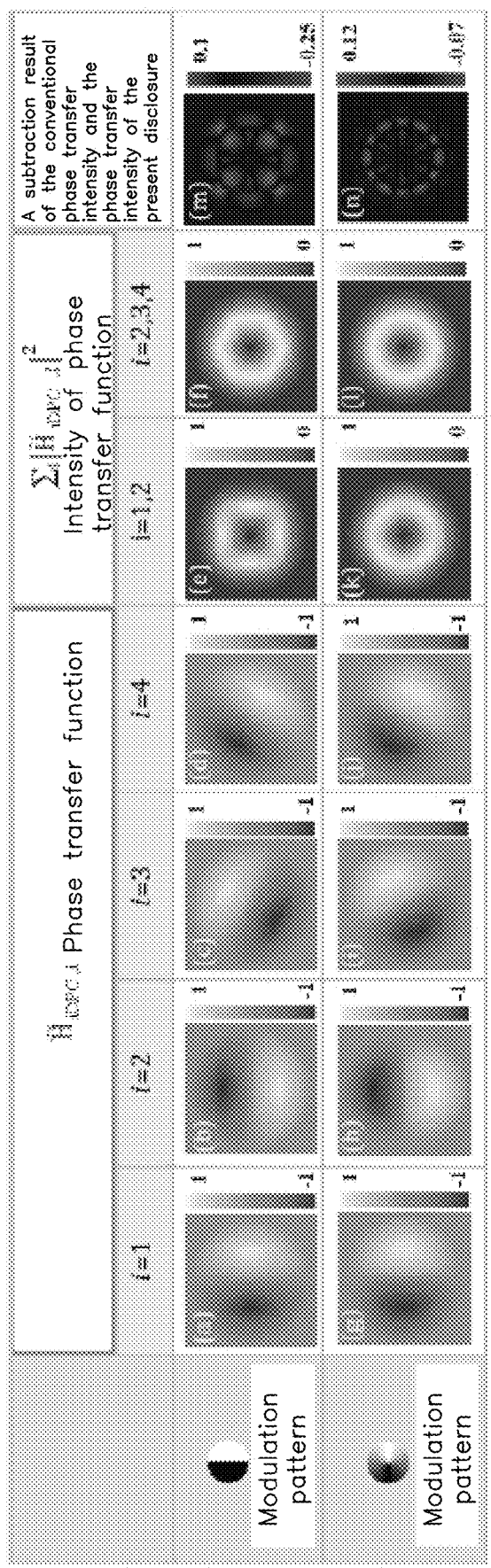
FIG. 10 is a diagram of comparisons between a semicircular modulation pattern of the conventional technique and a modulation pattern of the present disclosure having a gradient variation in optical amplitude.

FIG. 10 shows a comparison between the conventional technique and a modulation pattern of the present disclosure having a gradient variation of an optical amplitude. FIGS. 10 (a-d) are phase transfer function simulation images of a conventional semicircular modulation pattern in different axial directions. FIGS. 10 (e-f) represent the simulation images of the intensity of the phase transfer function when using two axes (i=1, 2) and using three axes (i=2, 3, 4), respectively. FIGS. 10 (g-j) are phase transfer function simulation images of the modulation patterns with a circular radial gradient variation in different axial directions. FIGS. 10 (k-l) represent simulation images of the intensity of the phase transfer functions when using two axes (i=1, 2) and using three axes (i=2, 3, 4), respectively.

FIG. 10(m) shows a result of subtraction of the phase transfer functions of FIG. 10(e) from FIG. 10(1). FIG. 10(n) shows a result of subtraction of the phase transfer functions of FIG. 10(f) from FIG. 10(1). As can be seen from the phase transition function intensity images of FIGS. 10(e-f) and FIGS. 10(m-n), in FIGS. 10(e-f), no matter whether biaxial or triaxial, the intensity of the transfer function exhibits a non-isotropic result. It should be noted that if the isotropic transfer function intensity image needs to be presented in the conventional technique, it would take up to 12 axes (as shown in FIG. 1C), which takes time and effort. However, the intensity of the transfer function of the present disclosure is as shown in FIG. 10(m-n). Under a partially coherent illumination, the transfer function image, having isotropic characteristics evenly distributed like a donut, only needs two or three axes. Compared to the prior art, the number of the axial directions is greatly reduced and an efficiency in detection is increased.

Figure 11:
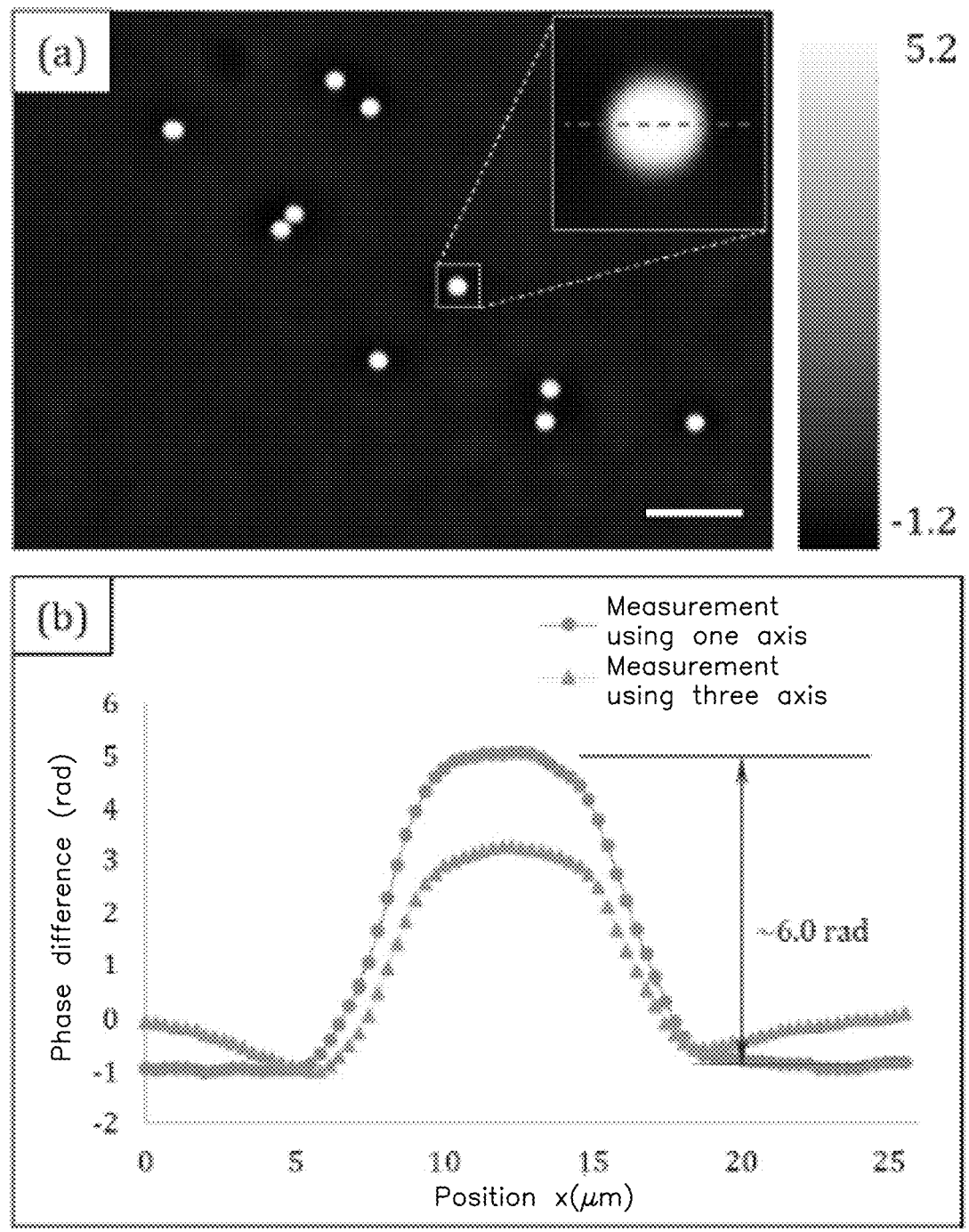
FIG. 11 is a diagram showing a result when the optical system of FIG. 8 is applied to the measurement of a surface profile on microspheres.

FIG. 11 is a schematic diagram showing the results of surface profile measurement of microspheres by using the optical system of FIG. 8. FIG. 11 (a) is an image of a plurality of microspheres. A white circular image is framed by one of the microspheres (small squares). A large square is an enlarged image. A dotted line in the enlarged square represents a section line. FIG. 11(b) shows the phase difference information distribution of the sphere position corresponding to the dotted line. The horizontal axis is the horizontal position of the microspheres in the dotted line, and the vertical axis is the phase difference. According to actual measurements, the measured phase difference is 6.0 rad, and a predicted phase difference is 6.25, thus a difference is only 4%. This is caused by an error of the size of each microsphere itself and refractive effect around the microsphere. It can be proved that the method of the present disclosure can indeed measure the phase information about the depth of the surface of the object, thereby being suitable and convenient for a surface profile reconstruction. In addition, it can be seen that the differential phase contrast calculation using three axes is more accurate than the differential phase contrast calculation using one axis.

Quantitative phase imaging techniques are rapidly evolving and various methods have been proposed and applied to observe weak phase features of the objects [1-3]. These methods are mainly divided into two parts: interferometric [4-6] and non-interferometric methods. Among non-interferometric techniques, differential phase contrast method with partially coherent light is playing an important role. Previous work of using pupil function engineering with various kinds of masks are designed to obtain quantitative phase images [7-9]. Typical DPC methods with half-circle based illumination [2,10], as well as isotropic DPC (iDPC) [11,12] techniques with asymmetric masks in illumination path require pairs of images along multiple axes to provide isotropic phase contrast images, but has limitation of longer acquisition time. In order to overcome the above problem, color-multiplexing strategies [13,14] have been used to speed up the process. Still, these techniques have difficulty in achieving the axially symmetric transfer function. To alleviate the artifacts due to missing frequencies, and to shorten the acquisition time, in this letter, we propose a new approach by using MW-iDPC method to obtain the isotropic phase contrast images.

MW-iDPC system is based on weak object transfer function which can be used to quantify phase information into intensity. In our approach, we designed an add-on illumination module and integrate it in a commercial inverted microscope to achieve differential phase contrast phenomena. A schematic diagram of MW-iDPC is shown in FIG. 12.

Figure 12:
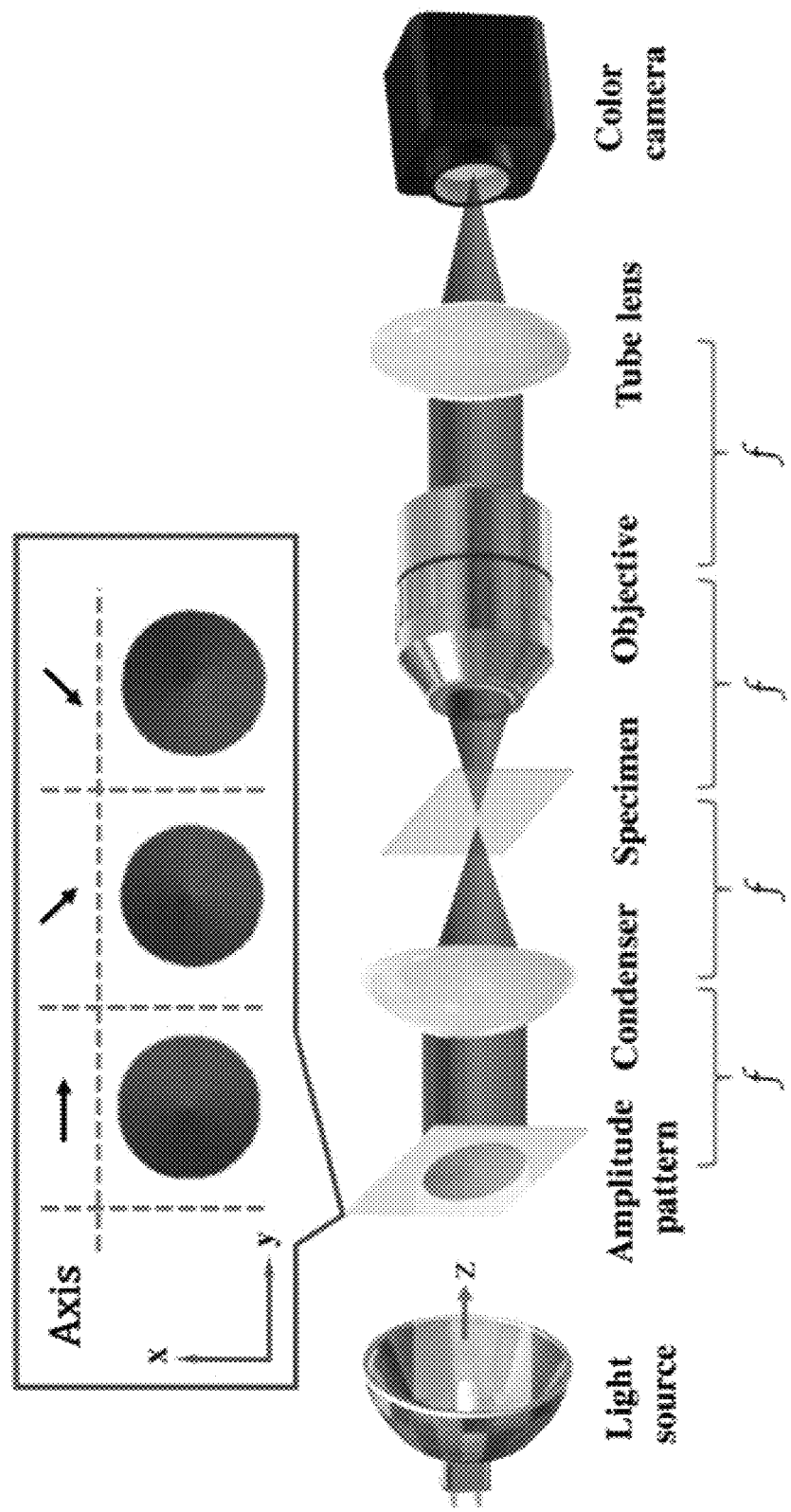
FIG. 12 is a schematic diagram of MW-iDPC system using a commercially inverted microscope.

FIG. 12 is a schematic diagram of MW-iDPC system using a commercially inverted microscope (IX70 Olympus). An add-on module based on Kohler illumination system consists of a tungsten-halogen lamp, and LCD screen (TFT Touch Shield, 240×320 pixels, pixel size: 0.18 mm) controlled by Arduino (UNO32) to display multi-wavelength asymmetric amplitude masks, positioned at the front focal plane of a piano-convex condenser lens (f=2.54 cm, LA1951, Thorlabs).

However, distinctions of spectral response curves between thin film transistor (TFT) and color image sensors lead to color leakage problem among different color channels. Strategy to overcome this problem has been suggested [14]. The multi-wavelength amplitude mask displayed on the TFT shield filters the original white light into three separate color spectrums (R, G and B channels). Each color channel carries different image information respectively. Because of the color leakage phenomenon, the light intensity of each TFT channel influence adjacent channels and severely degrades reconstructed image quality. The RGB-light intensities, collected by color camera, can be formulated as follows:

$$\begin{bmatrix} I_{Camera}^R \\ I_{Camera}^G \\ I_{Camera}^B \end{bmatrix} = T \begin{bmatrix} I_{TFT}^R \\ I_{TFT}^G \\ I_{TFT}^B \end{bmatrix} \quad (1)$$

Where $I_{Camera}^l$ and $I_{TFT}^l$ are the intensity of light measured in e channel of camera and TFT, respectively (l=R, G and B). T is a 3×3 transfer matrix, that transfers the intensity of original spectrum on TFT shield to the intensity received by camera.

$$T = \begin{bmatrix} L_R^R & L_R^G & L_R^B \\ L_G^R & L_G^G & L_G^B \\ L_B^R & L_B^G & L_B^B \end{bmatrix} \quad (2)$$

$L_w^v$ is the leakage ratio from v channel of TFT shield to w channel of camera (v, w=R, G and B), which can be obtained by calculating $$\frac{I_{avg,w}^v}{I_{avg,R}^v + I_{avg,G}^v + I_{avg,B}^v},$$

where $I_{avg,w}^v$ is the average intensity of pure color v displayed on the TFT shield that has been detected in w channel of camera. In order to recover the original images before light passing through the filters of camera, the inverse matrix of T is multiplied with the intensity received from color camera.

$$\begin{bmatrix} I_{TFT}^R \\ I_{TFT}^G \\ I_{TFT}^B \end{bmatrix} = T^{-1} \begin{bmatrix} I_{Camera}^R \\ I_{Camera}^G \\ I_{Camera}^B \end{bmatrix} \quad (3)$$

By virtue of color leakage correction, the quality of reconstructed images can be significantly improved. Nevertheless, every color camera has different spectral responses, T and $T^{-1}$ differ between different color cameras. Each system has to derive the matrix T once for color leakage correction in the initial state, so as to mitigate the error of phase distribution across different color channel and acquire accurate phase estimation.

In consideration of the specimen consists of weak phase objects [15], we can utilize phase transmission function $W(r)=e^{-\alpha(r)}e^{i\phi(r)}$, where r denotes the spatial coordinates (x, y), $\alpha(r)$ and $\phi(r)$ indicates as attenuation factor and optical phase. The weak phase object needs to be either has a small phase or be embedded in a uniform substrate with a constant refractive index to have slowly varying phase/refractive index. [16, 17] The working of our microscope can be explained as 4-f optical system as shown in FIG. 12. In the first instance, the amplitude mask of the condenser pupil is defined as $S(u)=\nabla(u)n(u)$ on TFT shield, while $u=(u_x, u_y)$ is the spatial frequency coordinates. $\nabla(u)=\Sigma_{i=1,\ldots,N}V_{\lambda_i}(u)$ is the amplitude mask function, and N is the number of wavelength, in our case N=2. $\rho=NA_{condenser}/\lambda$, where $NA_{condenser}$ is the numerical aperture of the condenser, and $\lambda$ is the operational wavelength of the light source. This function generates two azimuthal patterns compensating with each other under different wavelengths in our approach. $V_{\lambda_i}(u)$ and $n(u)$ are given by:

$$V_{\lambda_1}(u) = \begin{cases} \dfrac{\tan^{-1}\dfrac{u_y}{u_x}}{\pi}, & \text{if } u_x \geq 0 \\ -\dfrac{\tan^{-1}\dfrac{u_y}{u_x}}{\pi}, & \text{if } u_x < 0 \end{cases} \quad (4)$$

$$V_{\lambda_2}(u) = \begin{cases} \dfrac{\tan^{-1}\dfrac{u_y}{u_x}}{\pi}, & \text{if } u_x < 0 \\ -\dfrac{\tan^{-1}\dfrac{u_y}{u_x}}{\pi}, & \text{if } u_x \geq 0 \end{cases} \quad (5)$$

$$n(u) = \begin{cases} 0, & \text{if } \sqrt{u_x^2 + u_y^2} \geq \rho \\ 1, & \text{if } \sqrt{u_x^2 + u_y^2} < \rho \end{cases}, \quad (6)$$

P(u) is the pupil function in the objective lens, and under partially coherent illumination condition, the resultant image intensity captured on the camera can be written as [11,12]

$$I(r)=\iint |\Im\{\sqrt{S(u)}e^{i2\pi ur}W(r)\}\cdot P(u)\}|^2 d^2u, \quad (7)$$

Where $\Im$ denotes the Fourier transform induced by an condenser lens or objective. The outmost integration with respect to $u=(u_x, u_y)$ represents incoherent supposition of scattered light due to each point source S(u) at image plane. Invoking a weak object approximation with Taylor expansion, we linearize the translucent object as $W(r)=1-\alpha(r)+i\phi(r)$. The intensity of a weak phase specimen in the Fourier space can then be written as:

$$\tilde{I}(u) = \tilde{H}_{phase}\cdot\tilde{\phi}(u) + \tilde{H}_{amp}\cdot\tilde{\alpha}(u) + \tilde{H}_b\cdot\delta(u), \quad (8)$$

Where $\tilde{\phi}(u)$, and $\tilde{\alpha}(u)$ represent phase and absorption of the specimen accordingly. Hence, the expressions for phase transfer function $\tilde{H}_{phase}$, amplitude transfer function $\tilde{H}_{amp}$, and background term $\tilde{H}_b$ are given by [2]:

$$\tilde{H}_{phase} = j[\iint S(u')P(u'+u)P^*(u')d^2u' - \iint S(u')P(u')P^*(u'-u) d^2u'], \quad (9)$$

$$\tilde{H}_{amp} = [\iint S(u')PP(u')P^*(u'+u)d^2u' - \iint S(u')P(u'-u)P^*(u') d^2u'], \quad (10)$$

$$\tilde{H}_b = \iint S(u')|P(u')|^2 d^2u', \quad (11)$$

Furthermore, in our approach, isotropic differential phase contrast imaging is achieved using multi-color illumination in the conventional DPC imaging. By adopting color gradient asymmetric amplitude mask, isotropic differential phase contrast images are generated. Amplitude mask acts like a wavelength filter where the two colors provide complementary color gradient vector to each other. The MW-iDPC images ($I_{DPC,k}$) can be obtained using the below equation, $$I_{DPC,k}=(I_{\lambda_1,k}-I_{\lambda_2,k})/(I_{\lambda_1,k}+I_{\lambda_2,k}) \quad (12)$$

Following this step, for an aberration-free system, $\tilde{H}_{amp}\cdot\tilde{\alpha}(u)$ and $\tilde{H}_b\cdot\delta(u)$, are eliminated since these two terms are symmetrical. Hence in the derivation, only phase term $\tilde{H}_{phase}\cdot\tilde{\phi}(u)$ is retained, and then we can express the linear relationship as $\tilde{I}_{DPC}(u)=\tilde{H}_{phase}\cdot\tilde{\phi}(u)$.

Based on the equations (4-6), the multi-wavelength asymmetric amplitude masks are designed by blue and red color azimuthal patterns that correspond to three different axes to achieve isotropic transfer function. The axis of the color gradient is represented by arrows as shown in FIG. 12. Here we use blue and red color because the spectrum of red and blue is more separated than the combination with other colors. Influence of color leakage problem is expected to be less. Experimentally, we extract the intensity information ($I_{\lambda_1,k}$, $I_{\lambda_2,k}$) from the image captured by camera within blue and red color channels (k=1-3 axis). In our case, $\lambda_1$ is blue, and $\lambda_2$ is red as shown in FIG. 12. Quantitative phase information can then be obtained by solving equation (9) using Tikhonov regularization [2], where $\gamma$ represents the regularization parameter.

$$\tilde{\phi}(r) = \mathcal{F}^{-1}\left\{\frac{\sum_k (\tilde{H}_{phase,k}\cdot\mathcal{F}(I_{DPC,k}(r)))}{\sum_k |\tilde{H}_{phase,k}|^2 + \gamma}\right\}, \quad (13)$$

We first calibrate the proposed MW-iDPC microscope by measuring the phase distribution of polystyrene microspheres image (size=10 μm, $n_b$=1.59, 17136-5, Polysciences). The microspheres are immersed in the index matching oil ($n_s$=1.54) and placed between a microscope coverslip and a glass slide. Following equations (12,13), the quantitative phase image of microspheres is acquired by MW-iDPC after color leakage correction and shown in FIG. 13A and FIG. 13B.

Figure 13A:
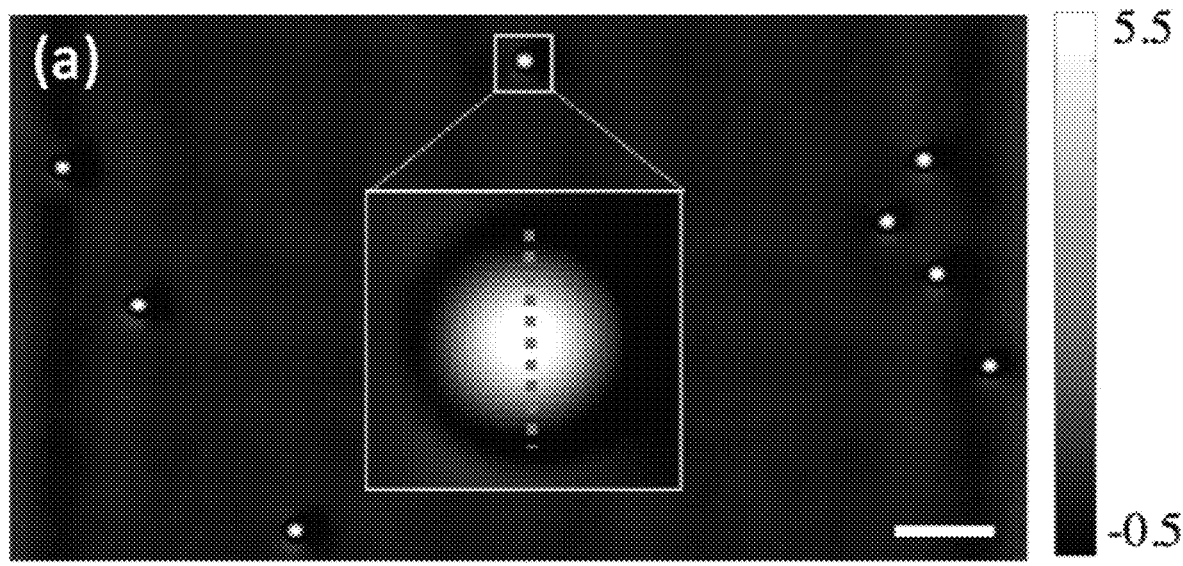
FIG. 13A is a quantitative phase image of microspheres reconstructed by MW-iDPC system with color leakage correction.

As we can clearly see, isotropic phase distribution of microspheres can be obtained by our method. The phase distribution along the dashed line of a zoomed-in microsphere at the highlighted box region in FIG. 13A is shown as a blue solid line in FIG. 13B. The inset of the gray scale bar indicates optical thickness of microspheres. Experimentally measured phase value of microsphere is 5.92 rad at a wavelength of 0.52 μm, while the calculated phase value $$\left(\Delta\phi = \frac{2\pi D(n_b - n_s)}{\lambda}\right)$$

is 6.04 rad, which are in the good agreement. The difference between calculated and measured phase is 1.9%, which may be due to uncertainties of the size of microspheres and refractive index variation between microspheres and surrounding medium. However, without color leakage correction, the phase delay shown as an orange dashed line in FIG. 13B was measured to be 8.35 rad, which corresponds to 38.2% more than the calculated phase value. By applying color leakage correction, phase measurement error can be reduced about 36%. As a result, we can conclude that with the process of color-leakage correction, the discrepancy of phase accuracy can be significantly improved.

Figure 13B:
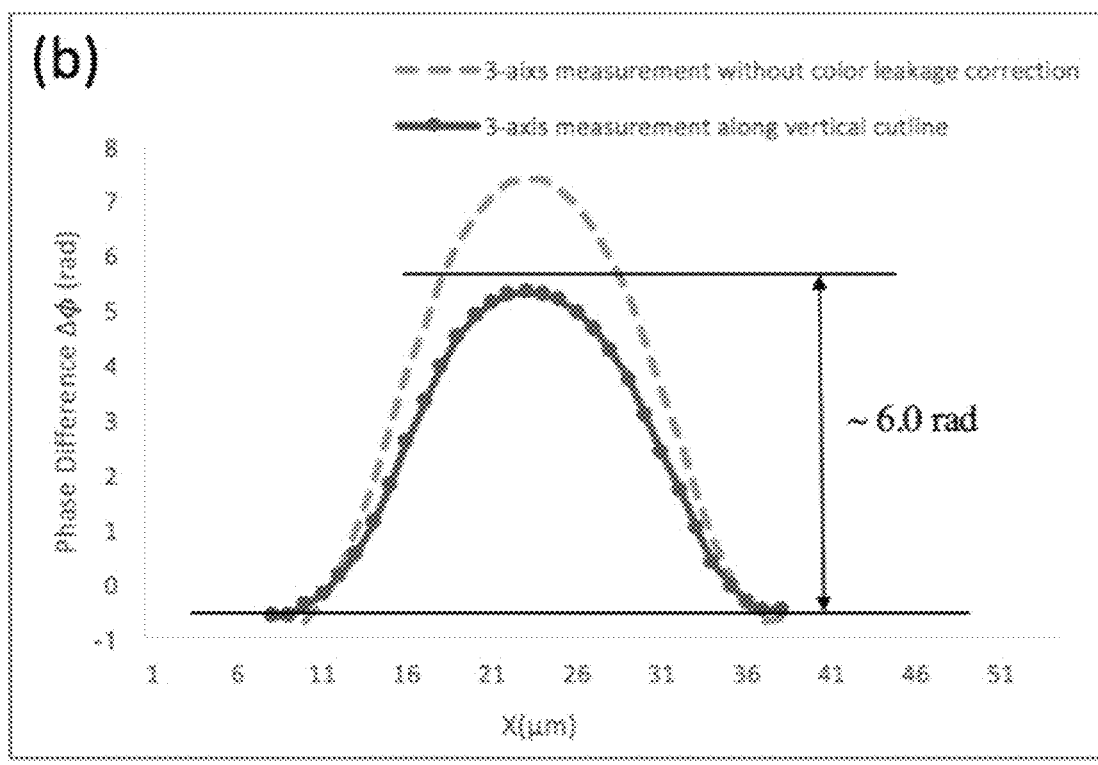
FIG. 13B is a measured phase distribution of the cross-section along the dashed line of a zoom-in microsphere.

FIG. 13A is a quantitative phase image of microspheres reconstructed by MW-iDPC system with color leakage correction. FIG. 13B is a measured phase distribution of the cross-section along the dashed line of a zoom-in microsphere in FIG. 13A, with color-leakage corrected (solid line) and uncorrected (dashed line) cases. Process of color-leakage correction significantly improves phase estimation accuracy. The scale bar is 50 μm.

Figure 14:
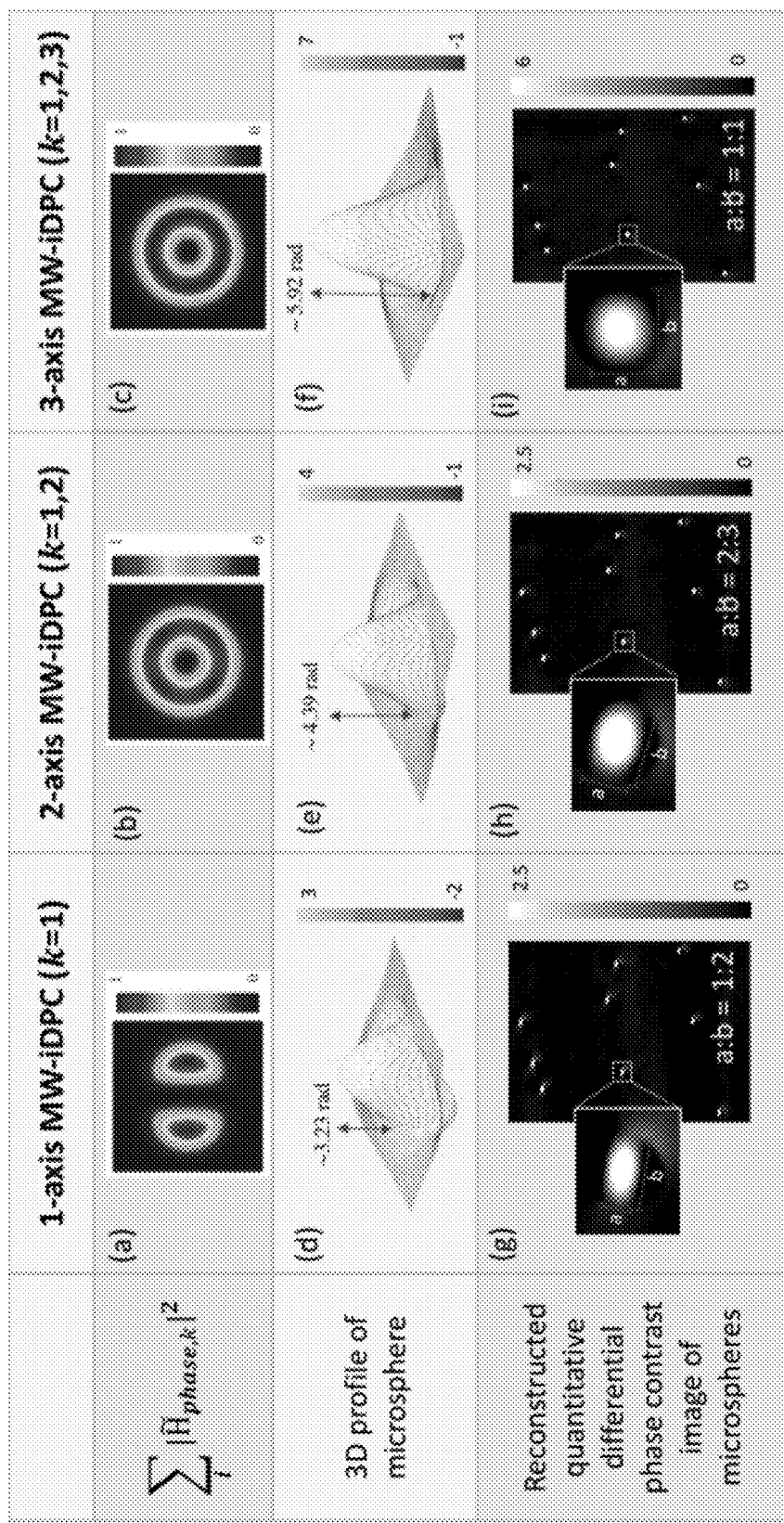
FIG. 14 shows the constructed quantitative phase images of live breast cancer cells.

In FIG. 14, we compare simulation results of the intensity of phase transfer function $(\Sigma|\tilde{H}_{phase,k}|^2)$ with multiple axes using multi-wavelength amplitude masks and shows the corresponding reconstructed quantitative phase contrast image of microspheres. FIG. 14(d-i) show the respective phase profile of microspheres using three different amounts of axes for measurements. The aspect ratio shown as a:b=1:1 for the 3-axis measurement is due to the circularly symmetric phase transfer function, while the deviation of aspect ratio in the ellipse using 1 and 2-axis measurement is because of the anisotropy of phase transfer function as shown in FIG. 14(a-c). By applying 3-axis MW-iDPC, phase measurement can be improved by 19.2% and 25.3% with respect to 1-axis and 2-axis measurement. Microspheres in FIG. 14 (g,h) are not symmetric, which illustrates that the missing frequencies of the iDPC transfer function with just 1 or 2-axis measurement can exert direct influence on the reconstructed performance. Nonetheless, with only 3-axis measurement, the recovered shape of the microsphere can be thoroughly circular, and proved that the circularly symmetric intensity of transfer function can serve as direct evidence of avoiding artifacts with sufficient frequencies for phase reconstruction. Furthermore, we have applied MW-iDPC to observe phase structures of live biological samples.

FIG. 14 shows the constructed quantitative phase images of live breast cancer cells. FIG. 14(i-ii) show corresponding three-dimensional visualizations of particular cells highlighted in the solid color.

FIG. 14(a-c) are simulation results of intensity of transfer function $(\Sigma|\tilde{H}_{phase,k}|^2)$ with 1, 2 and 3-axis. The respective phase profiles of microspheres correspond to different approach of measurement to examine the reconstructed performance. With the 3-axis measurement, we can get isotropic transfer function, a and b are the lengths of the horizontal and vertical axes of the microsphere, and a:b represents the aspect ratio.

Boxes on the reconstructed iDPC image. The arrows indicate the direction of the cell according to the original iDPC image. The color bar in gray scales represents quantitative phase recovery of the cells in radians. Detailed information of live cells can be clearly discerned. Owing to the weak phase approximation, our method is limited to unstained transparent samples and barely can be applied to the thick absorptive samples. In this work, we did not consider nonlinear effects of color leakage correction on image quality. The accuracy of color leakage correction of our method is limited to the sensitivity of image sensor. Although a single shot quantitative phase imaging can be performed, however the transfer functions of these methods are not isotropic, resulting in the poor phase contrast and low signal to noise ratio. These artifacts can be improved by our 3-axis approach method.

FIG. 15 is a quantitative phase image of live breast cancer cells using MW-iDPC system.

In conclusion, isotropic differential phase contrast phenomena for weak phase object by multi-wavelength illumination in 3-axis measurement is performed. An add-on module consists of a programmable device is used to display the desired masks in illumination path. With our compact configuration, isotropic transfer function can be obtained to generate quantitative phase image with less artifact and imperfections. We show experimental results for quantitative phase measurement of live biological samples and found that in MW-iDPC imaging, the color leakage correction plays a crucial role. With multi-wavelength illumination, phase information for different wavelengths can be simultaneously extracted from different color channels which reduces acquisition time to half, and makes this method two-time faster than the previous one [11]. In addition, it also enables us to take time-lapse observation by synchronizing the TFT shield with CCD, for fully automated mechanism.

Figure 16:
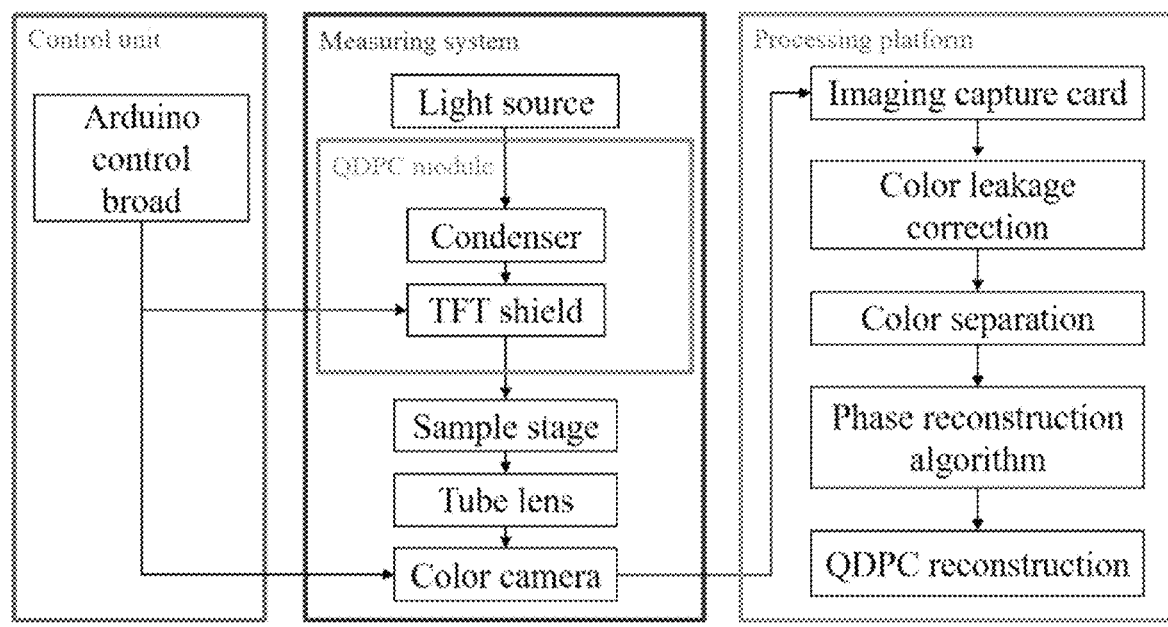
FIG. 16 is a functional structure of the develop QDPC system.

Design and Development of Quantitative Differential Phase Contrast (QDPC) Microscopy FIG. 16 shows functional structure of the developed QDPC system, which is consisted of control unit, inverted microscope, QDPC module, and processing platform. The measuring system is built on a commercial inverted microscope with add-on QDPC module. While light passing through the QDPC module, the thin-film transistor (TFT) shield can generate asymmetric color illumination and the condenser then focuses the structure light on the sample. The control unit is used to display the color-coded pattern on the TFT shield and synchronize the color camera at the same time. That is, the system can automatically finish acquisition. After acquisition, processing platform converts the images into reconstructed phase images.

Designed Concept and Optical Configurations

Figure 17:
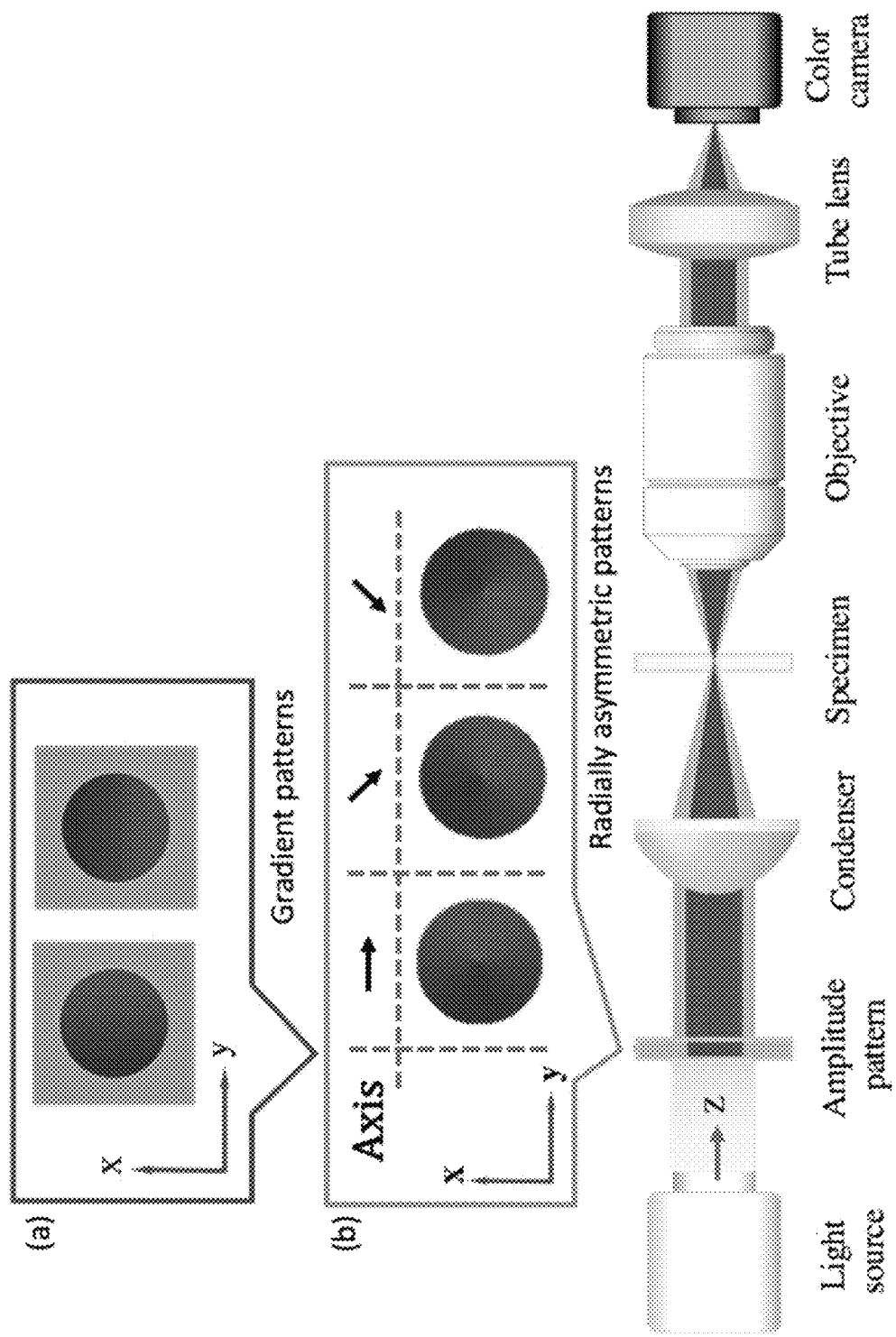
FIG. 17 is an optical configuration of QDPC measurement system.

According to the functional structure, the optical configuration of modular QDPC is shown in FIG. 17. Two pairs of different patterns are shown on the top of FIG. 17: Pair (a)

is color gradient asymmetric amplitude patterns along x axis and y axis, and Pair (b) is multi-wavelength radially asymmetric amplitude patterns along three different axes with 60-degree interval. The patterns are controlled using a programmable thin-film transistor (TFT) setup, located in Fourier space in illumination, and enable to improve phase recovery and reduce phase reconstruction artifacts of missing frequencies for our system. Each image generates a differential phase contrast image, which is utilized to reconstruct QDPC image.

Color Gradient Pupils Designed

For gradient pupil, the amplitude mask S(u) on TFT shield is:

$$S(u)=n(u)m(u) \quad (2.1)$$

The gradient part m(u) and the clear pupil part n(u) are given by $$m(u) = \begin{cases} \dfrac{\pm x + r}{2r}, & \text{for } \pm x \text{ axis direction} \\ \dfrac{\pm y + r}{2r}, & \text{for } \pm y \text{ axis direction} \end{cases} \quad (2.2)$$

$$n(u) = \begin{cases} 0, & \text{if } \sqrt{x^2 + y^2} \geq r \\ 1, & \text{if } \sqrt{x^2 + y^2} < r \end{cases} \quad (2.3)$$

Figure 18:
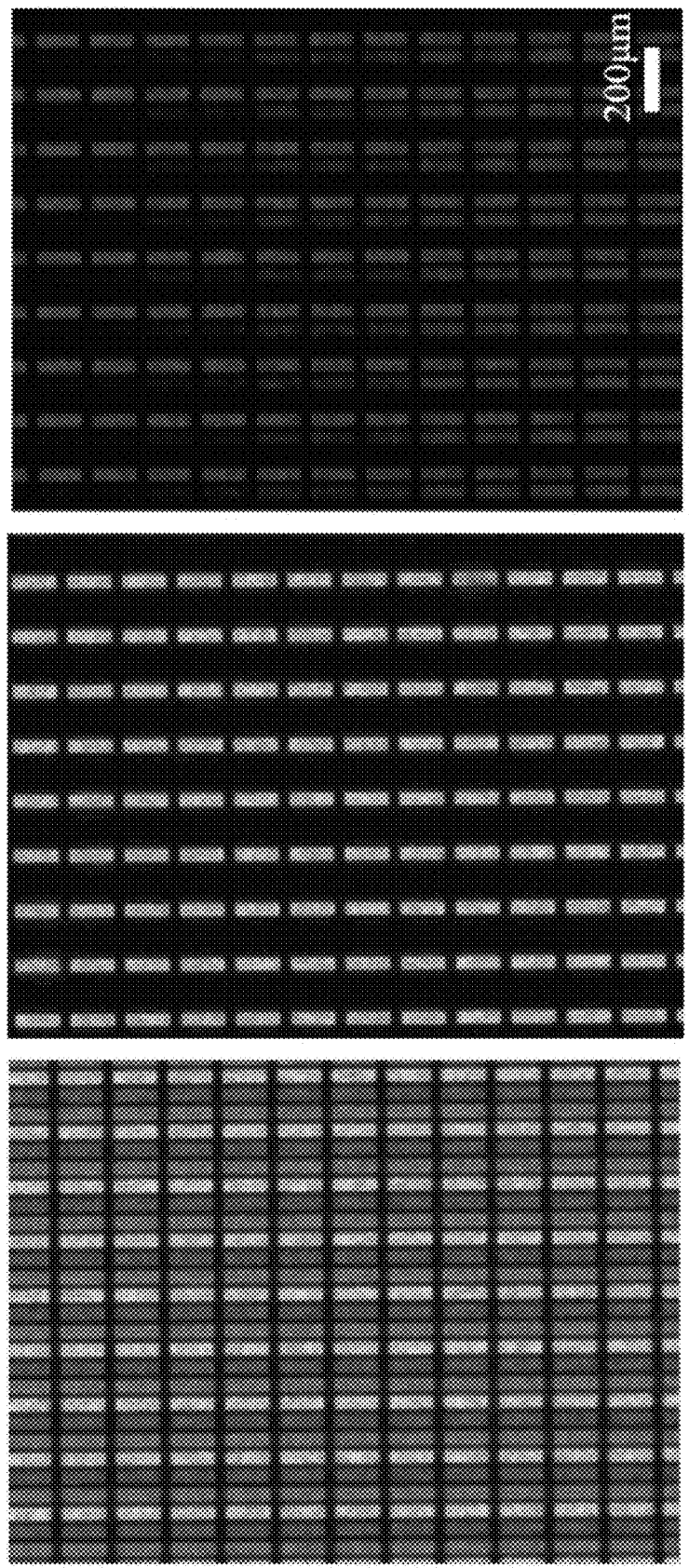
FIG. 18 shows the TFT shield with different color displayed.

FIG. 18 shows the TFT shield illuminated by white light under microscope. The TFT shield is composed by three color channels. FIGS. 18(a), (b) and (c) are the TFT shield with white, green and gradient purple displayed. The TFT shield displays white when all three channels are fully turn on. By changing transmittance of TFT shield, it can fully turn on and off channels or give a gradient transmittance to any channel. Thanks to these characters of TFT shield, although it will sacrifice some intensity of light, it can generate the purposed color coded asymmetric gradient amplitude pattern.

Figure 19:
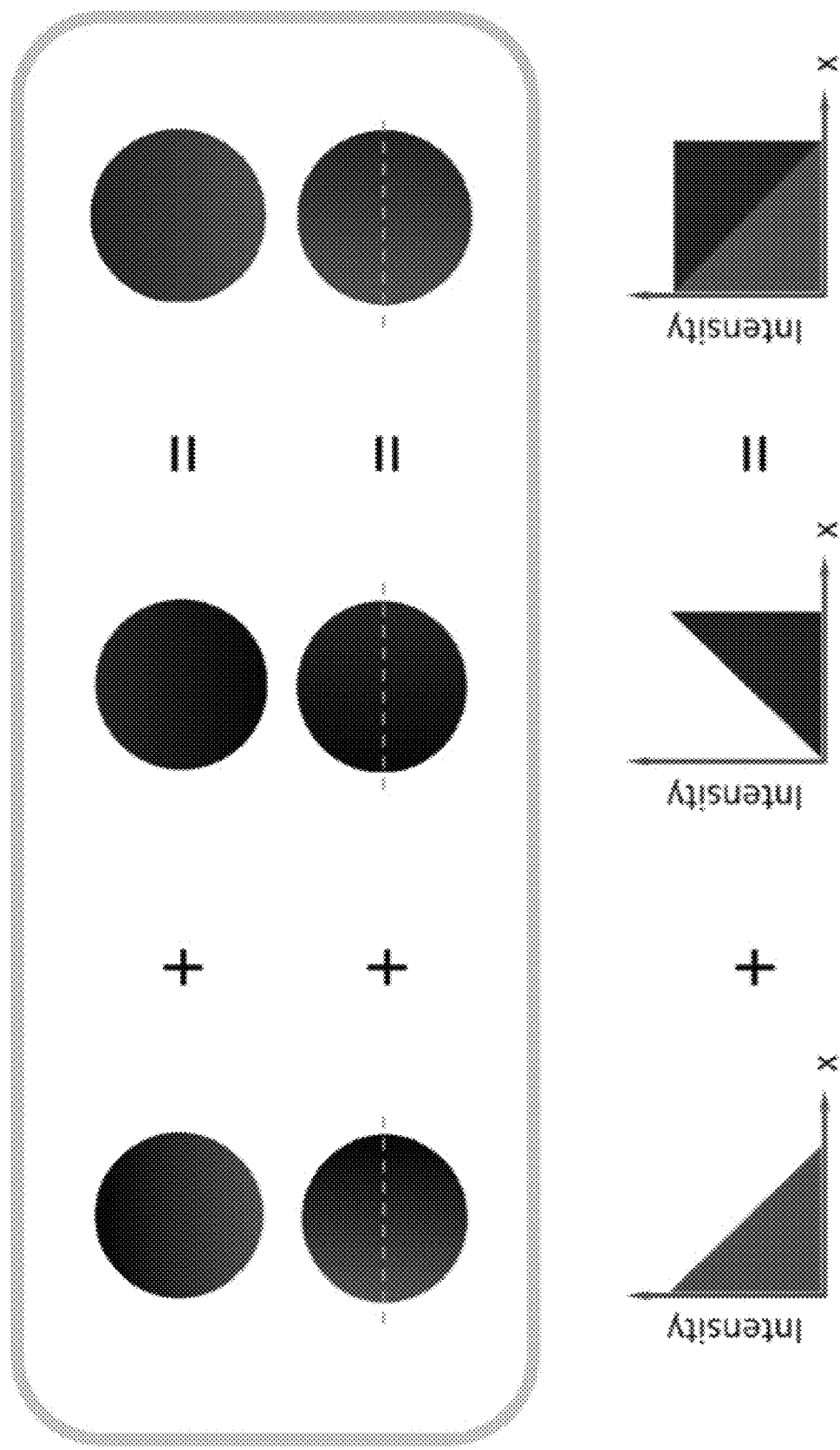
FIG. 19 shows pupil forms and illumination intensities.

To fully remove these phase reconstruction artifacts, we capture 2-axis combined Differential Phase Contrast (DPC) measurements to obtain circularly symmetric transfer function such that all spatial frequencies are obtained. Indeed, each pixel on a TFT shield offers different value in gray scale; thus, gradient illumination is modeled through our TFT setup for digital adjustment. In FIG. 19 shows the intensity distribution of the color gradient asymmetric amplitude patterns on the TFT shield. Within the pupil, 2 gradient pattern using different color spectrum are both display on the TFT shield. Ideally, total intensity in each location will always remain the same. The spectrum of red and blue is more separated than the combination with green, so the visibility of sample in unprocessed image is higher and influence of color leakage problem is less. There will be more description about color leakage at follow.

Figure 20:
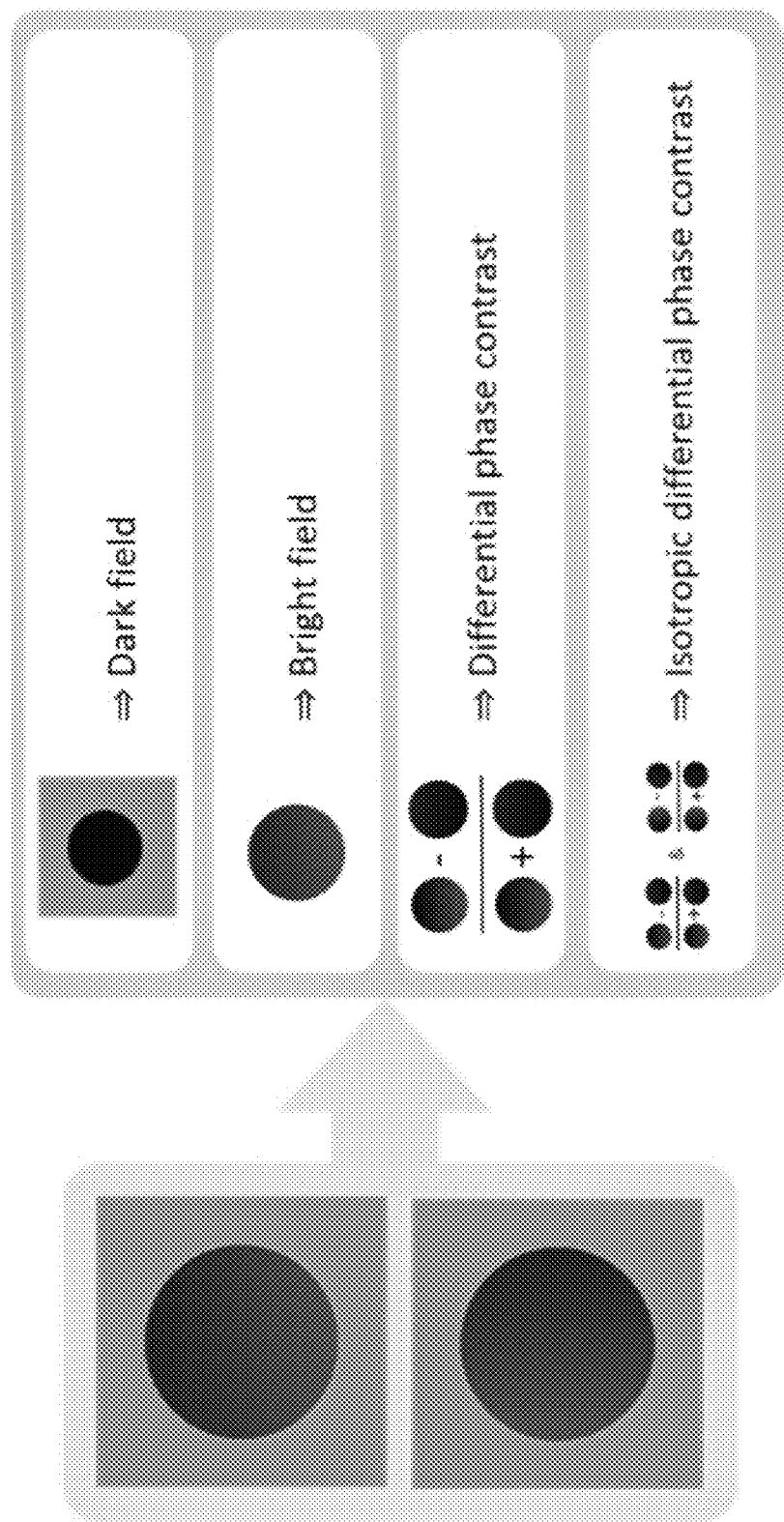
FIG. 20 shows four illumination-types for imaging.
Figure 21:
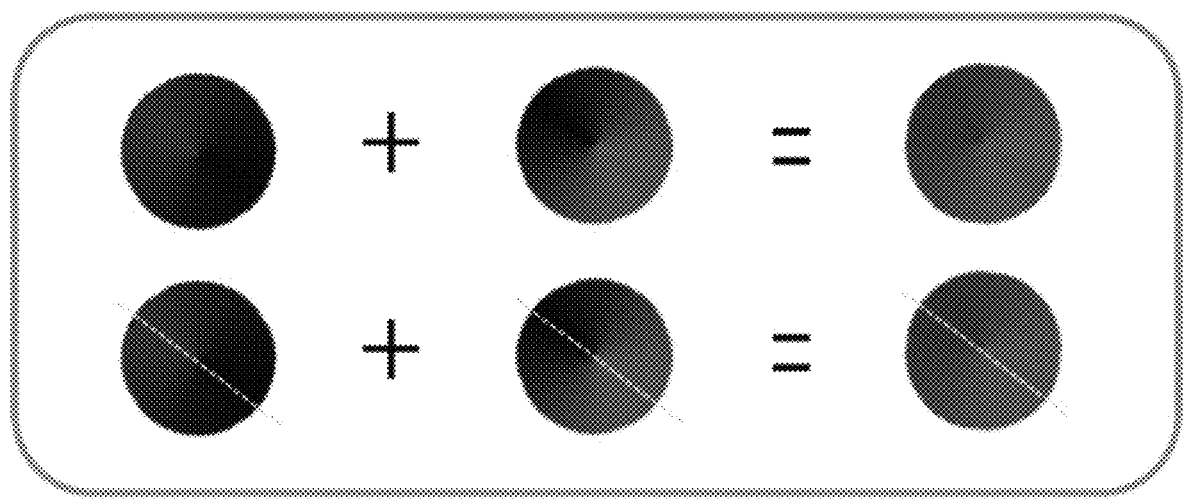
FIG. 21 shows pupil forms.

For adapting different applications, TFT shield can be classified into four different illumination-types according to the pattern on TFT shield as shown at FIG. 20. While the intensity of red light and blue light in the image are removed, withdraw the residual green light, a dark field image can be obtained. In contrast, if the intensity of green light in the image are removed, combing the intensity from the remaining red and blue light, a bright field image can be obtained. And by calculating the information from red and blue channel, DPC image and QDPC image could both be reconstructed. Only one acquisition, dark field, bright field and DPC image can be simultaneously obtained. And with only two pictures, a QCPC image can be reconstructed.

Although the color illumination reduces the acquisition times, the resolution of color CCD is two times worse than black and white CCD. And dispersion and color leakage problem will reduce the measurement accuracy. Furthermore, different wavelengths will cause the calculation error on QDPC image reconstruction.

Multi-Wavelength Radially Asymmetric Pupils Designed

For radially asymmetric pupils, the amplitude mask of the condenser pupil is defined as $S(u)=\overline{V}(u)n(u)$ on TFT shield, while $u=(u_x, u_y)$ is the spatial frequency coordinates. $\overline{V}(u)=\Sigma_{i=1,\ldots,N}V_{\lambda_i}(u)$ is the amplitude mask function, and N is the number of wavelength, in our case N=2. $\rho=NA_{condenser}/\lambda$, where $NA_{condenser}$ is the numerical aperture of the condenser, and $\lambda$ is the operational wavelength of the light source. This function generates two azimuthal patterns compensating with each other under different wavelengths in our approach. $V_{\lambda_i}(u)$ and n(u) are given by:

$$V_{\lambda_1}(u) = \begin{cases} \dfrac{\tan^{-1}\dfrac{u_y}{u_x}}{\pi}, & \text{if } u_x \geq 0 \\ -\dfrac{\tan^{-1}\dfrac{u_y}{u_x}}{\pi}, & \text{if } u_x < 0 \end{cases} \quad (2.4)$$

$$V_{\lambda_2}(u) = \begin{cases} \dfrac{\tan^{-1}\dfrac{u_y}{u_x}}{\pi}, & \text{if } u_x < 0 \\ -\dfrac{\tan^{-1}\dfrac{u_y}{u_x}}{\pi}, & \text{if } u_x \geq 0 \end{cases} \quad (2.5)$$

$$n(u) = \begin{cases} 0, & \text{if } \sqrt{u_x^2 + u_y^2} \geq \rho \\ 1, & \text{if } \sqrt{u_x^2 + u_y^2} < \rho \end{cases} \quad (2.6)$$

The multi-wavelength asymmetric amplitude patterns are designed by blue and red color azimuthal patterns that correspond to three different axes to achieve isotropic transfer function. The axis of the color gradient is represented by arrows as shown in FIG. 17(b). Here we use blue and red color because the spectrum of red and blue is more separated than the combination with other colors. Influence of color leakage problem is expected to be less.

Theory of QDPC Reconstruction

P(u) is the pupil function in the objective lens, and under partially coherent illumination condition, the resultant image intensity captured on the camera can be written as:

$$I(r)=\iiint \Im\{\Im[\overline{S(u)}e^{i2\pi ur}W(r)]\cdot P(u)\}|^2 d^2u, \quad (2.7)$$

Where $\Im$ denotes the Fourier transform induced by an condenser lens or objective. The outmost integration with respect to $u=(u_x, u_y)$ represents incoherent supposition of scattered light due to each point source S(u) at image plane. Invoking a weak object approximation with Taylor expansion, we linearize the translucent object as $W(r)=1-\alpha(r)+i\phi(r)$. The intensity of a weak phase specimen in the Fourier space can then be written as:

$$\tilde{I}(u)=\tilde{H}_{phase}\cdot\tilde{\phi}(u)+\tilde{H}_{amp}\cdot\tilde{\alpha}(u)+\tilde{H}_b\cdot\delta(u), \quad (2.8)$$

Where $\tilde{\phi}(u)$, and $\tilde{\alpha}(u)$ represent phase and absorption of the specimen accordingly. Hence, the expressions for phase transfer function $\tilde{H}_{phase}$, amplitude transfer function $\tilde{H}_{amp}$, and background term $\tilde{H}_b$ are given by:

$$\tilde{H}_{phase}=j[\iint S(u')P(u'+u)P^*(u')d^2u'-\iint S(u')P(u'-u)P^*(u') d^2u'], \quad (2.9)$$

$$\tilde{H}_{amp}=[\iint S(u')PP(u')P^*(u'+u)d^2u'-\iint S(u')P(u'-u)P^*(u') d^2u'], \quad (2.10)$$

$$\tilde{H}_b=\iint S(u')|P(u')|^2 d^2u', \quad (2.11)$$

Furthermore, for either color gradient pupil patterns or multi-wavelength radially asymmetric patterns, isotropic differential phase contrast imaging is achieved using multi-color illumination in the conventional DPC imaging. By adopting color amplitude mask, isotropic differential phase contrast images are generated. Amplitude mask acts like a wavelength filter where the two colors provide complementary color gradient vector to each other. The MW-iDPC images ($I_{DPC,k}$) can be obtained using the below equation:

$$I_{DPC,k}=(I_{\lambda_1,k}-I_{\lambda_2,k})/(I_{\lambda_1,k}+I_{\lambda_2,k}) \quad (2.12)$$

Following this step, for an aberration-free system, $\tilde{H}_{amp} \cdot \tilde{\alpha}$ (u) and $\tilde{H}_b \cdot \tilde{\delta}(u)$, are eliminated since these two terms are symmetrical. Hence in the derivation, only phase term $\tilde{H}_{phase} \cdot \tilde{\phi}(u)$ is retained, and then we can express the linear relationship as:

$$\tilde{I}_{DPC}(u)=\tilde{H}_{phase} \cdot \tilde{\phi}(u). \quad (2.13)$$

Experimentally, we extract the intensity information ($I_{\lambda_1,k}$, $I_{\lambda_2,k}$) from the image captured by camera within blue and red color channels (k=1-2 axis for patterns (a) and k=1-3 axis for patterns (b)). In our case, $\lambda_1$ is blue, and $\lambda_2$ is red as shown in FIG. 2.2(b). Quantitative phase information can then be obtained by solving equation (9) using Tikhonov regularization [2]:

$$\tilde{\phi}(r) = \mathcal{F}^{-1}\left\{ \frac{\sum_k (\tilde{H}_{phase,k}^* \cdot \mathcal{F}(I_{DPC,k}(r)))}{\sum_k |\tilde{H}_{phase,k}|^2 + \gamma} \right\}, \quad (2.14)$$

Where $\gamma$ represents the regularization parameter.

Embodiment Design and Construction

Figure 22:
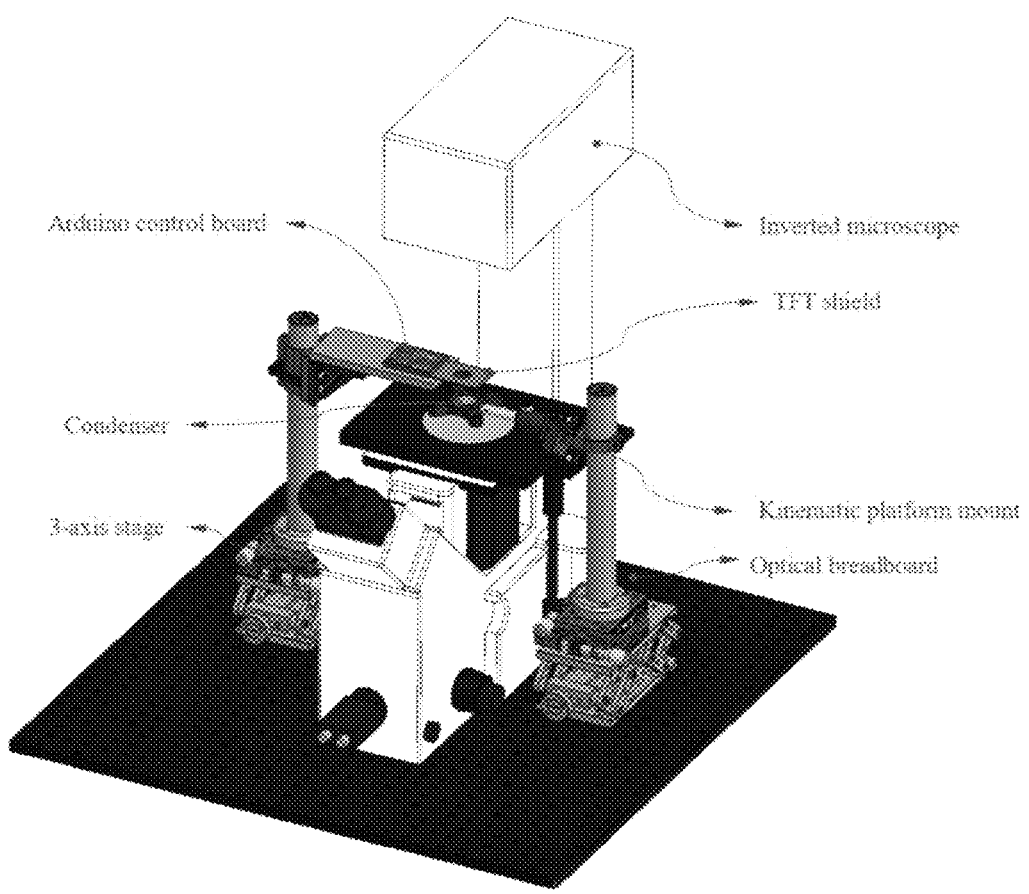
FIG. 22 shows a modular QDPC microscope.

The modular QDPC microscope is built on a commercial inverted microscope equipped with a light source using a tungsten-halogen lamp, an objective lens (NA0.4×20), and a color camera, was utilized for measurements. A TFT shield (Arduino 2.8" TFT Touch Shield), controlled by Arduino control board (UNO32) to display color gradient asymmetric amplitude patterns, was positioned at the front focal plane of a plano-convex condenser lens (LA1951, Thorlab). For alignment of condenser and TFT shield, these two components were mounted on two 3-axis manual stages respectively. And a kinematic platform mount was used for adjusting condenser tilting. The setup of modular QDPC microscope is shown in FIG. 22.

Figure 23:
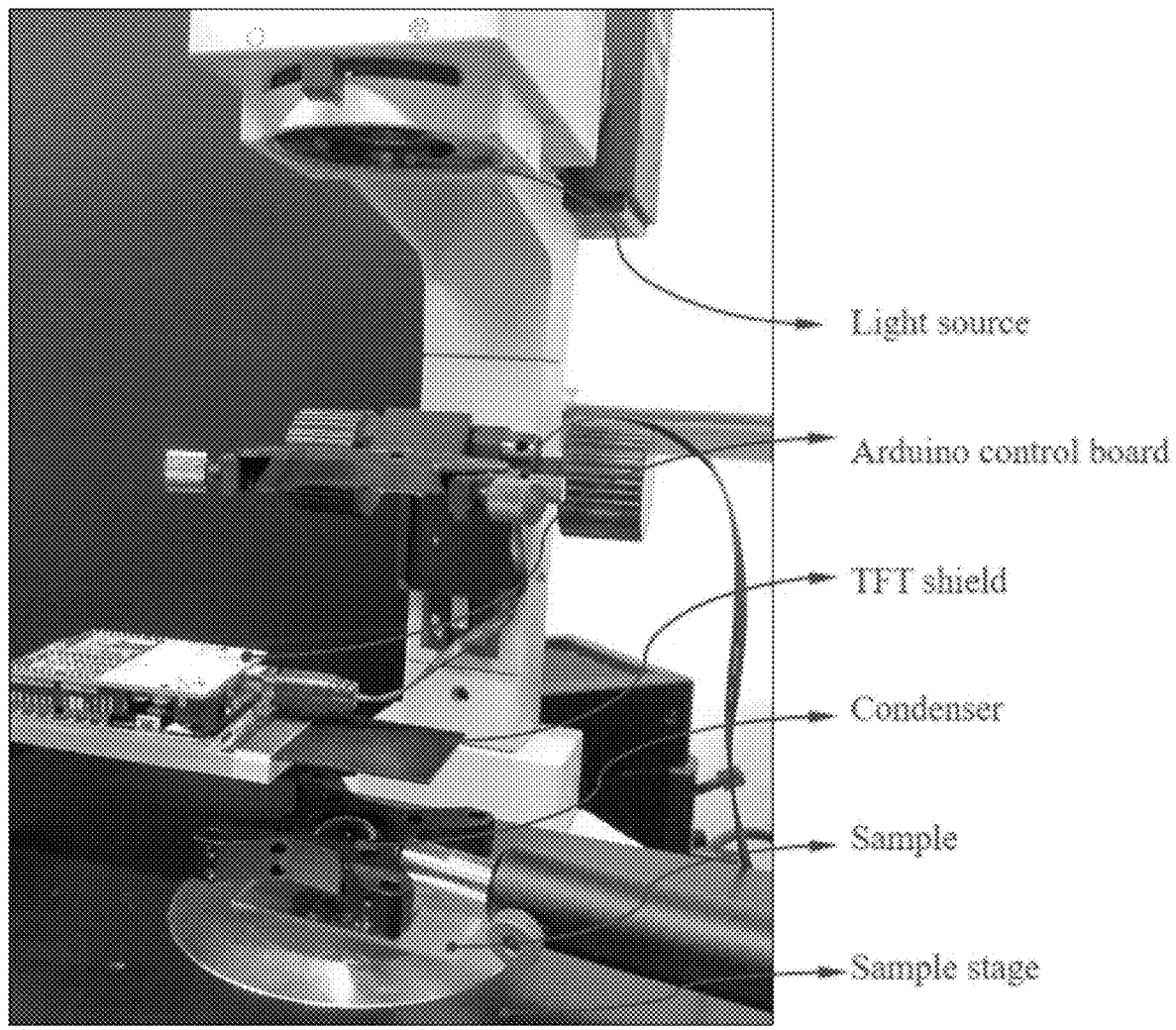
FIG. 23 shows a close shot of modular QDPC device.
Figure 24:
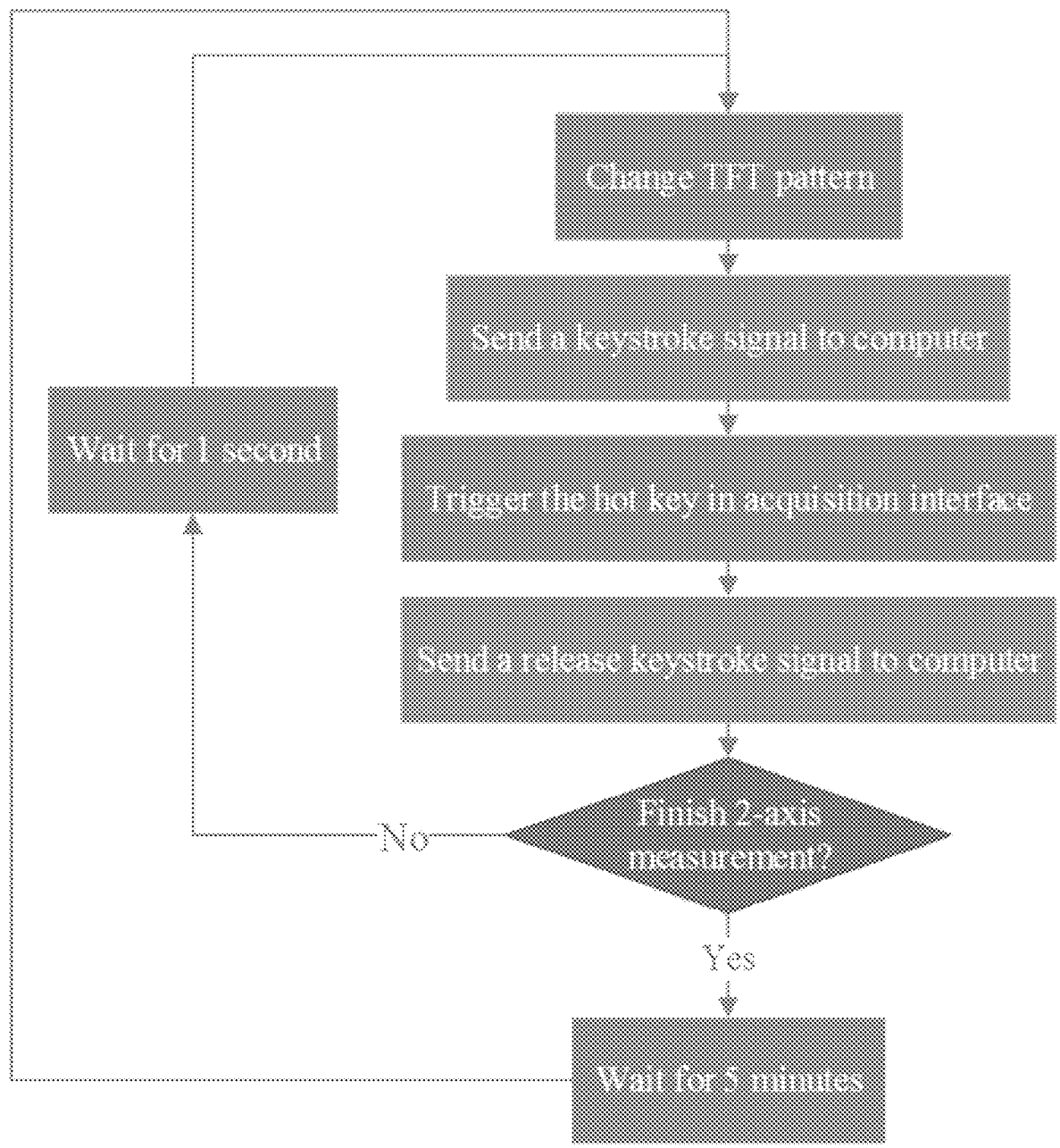
FIG. 24 shows a flow diagram of acquisition control.

In FIG. 23 shows a close shot of modular QDPC device. The illumination light was emitted from the lamp house of microscope. The color gradient asymmetric amplitude patterns, generated by a programmable thin-film transistor (TFT) shield, is located at the illumination pupil in the Fourier space. The specimen is placed in the back focal plane of the condenser, as well as in the front focal plane of the objective.

Automation Strategy for Acquisition

For long term obverting of changes in live cells, it is important to develop an automation strategy for acquisition. In order to synchronize the color camera on the microscope and TFT shield, Arduino control board have to send a key stroke to trigger the hot key of camera acquisition in computer.

For the purpose of making Arduino control board sent an 8 bytes keystroke signal to computer, chip Atmega8U2 on Arduino have to be updated from original "USB-to-serial" function to "HID device" function. Atmel FLIP is a software that can switch Arduino control board to "device firmware upgrade (DFU)" mode. In this mode, a new function can be written into chip Atmega8U2. The software Atmel FLIP can be download from a free online source. According to key codes from HID usage table, arbitrary key stroke signal can be sent from Arduino control board to computer. The code in Arduino for the QDPC microscope include four functions. One is to control the pattern on TFT shield. Another is to send keystroke to capture images. The other is to decide acquisition timing. The last is to synchronize the TFT shield and acquisition time of color camera.

Procedure to start automation of acquisition using Arduino is very simple. Do not need to do further setup or open any other software in computer. Just open the original acquisition interface of camera, and plug in the coded Arduino board into USB port, the automation of acquisition will start. In contrast, while plug out the Arduino control board, the acquisition process will stop immediately. Other detailed acquisition setting like exposure time, gain or binning still can be adjusted on the original interface of camera. This method is applicable at every acquisition device that its acquisition interface has a hot key to trigger camera.

Color Leakage Correction

The color pattern displayed on the TFT shield filters the original white light into three separated color spectrums by channel red, green and blue. (R, G and B). And each color channel will carry different image information. However, the emitted color spectrums generated by TFT shield may not totally match the spectral response of color camera. Intensity of light from the red channel of TFT will have little portion received by blue and green channel of color camera. Same as blue and green channel. This phenomenon called "color leakage". This phenomenon will let the information of different color channels mix together and largely reduce the accuracy of reconstructed images. The intensity received by color camera can be written as:

$$\begin{bmatrix} I^R_{Camera} \\ I^G_{Camera} \\ I^B_{Camera} \end{bmatrix} = T \begin{bmatrix} I^R_{TFT} \\ I^G_{TFT} \\ I^B_{TFT} \end{bmatrix}, \quad (3.11)$$

Where $I_{Camera}^g$ and $I_{TFT}^g$ are the intensity of light that the spectrums are decided by g channel of camera and TFT shield. And T is a 3×3 transfer matrix, transfer the intensity with original spectrum to the intensity received by camera, and it can be written as:

$$\begin{bmatrix} L_R^R & L_R^G & L_R^B \\ L_G^R & L_G^G & L_G^B \\ L_B^R & L_B^G & L_B^B \end{bmatrix}, \quad (3.12)$$

Where $L_w^v$ is the leakage ratio leaking from v channel of TFT shield to w channel of camera (v, w=R, G and B), which can be obtained by calculating, $$\frac{I^v_{avg,w}}{I^v_{avg,R}+I^v_{avg,G}+I^v_{avg,B}},$$

where $I_{avg,w}^v$ is the average intensity of pure color v displayed on the TFT shield that has been detected in w channel of camera. In order to recover the original images before light passing through the filters of camera, the inverse matrix of T is multiplied with the intensity received from color camera.

$$\begin{bmatrix} I_{TFT}^R \\ I_{TFT}^G \\ I_{TFT}^B \end{bmatrix} = T^{-1} \begin{bmatrix} I_{CCD}^R \\ I_{CCD}^G \\ I_{CCD}^B \end{bmatrix}. \quad (3.13)$$

By virtue of color leakage correction, the quality of reconstructed images can be significantly improved. Nevertheless, every color camera has different spectral responses, T and $T^{-1}$ differ between different color cameras. Each system has to derive the matrix T once for color leakage correction in the initial state, so as to mitigate the error of phase distribution across different color channel and acquire accurate phase estimation. The measurement for color leakage correction will be demonstrated.

Experimental for Color Leakage Correction

Figure 25:
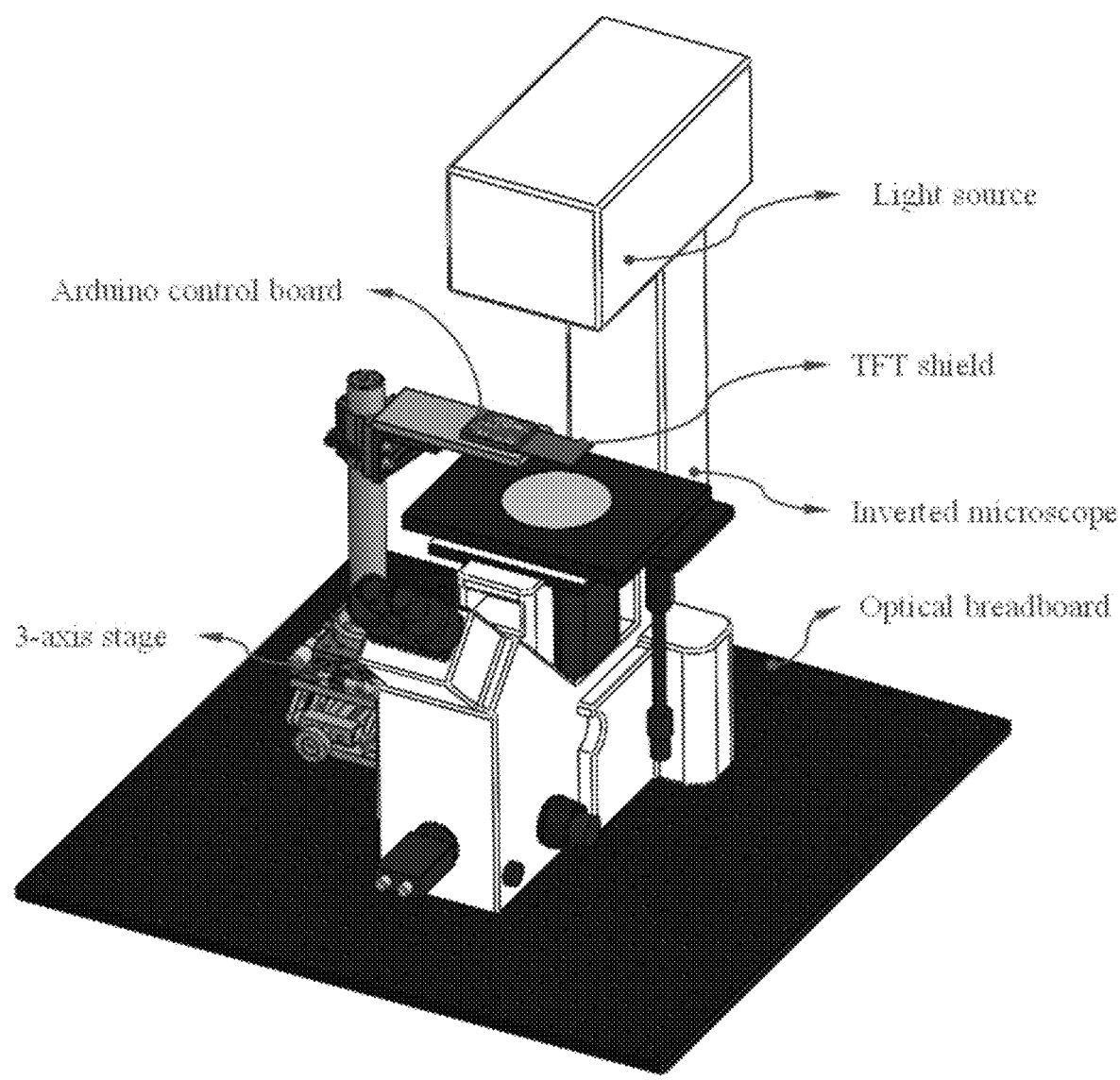
FIG. 25 shows experiment setup for color leakage correction.
Figure 26:
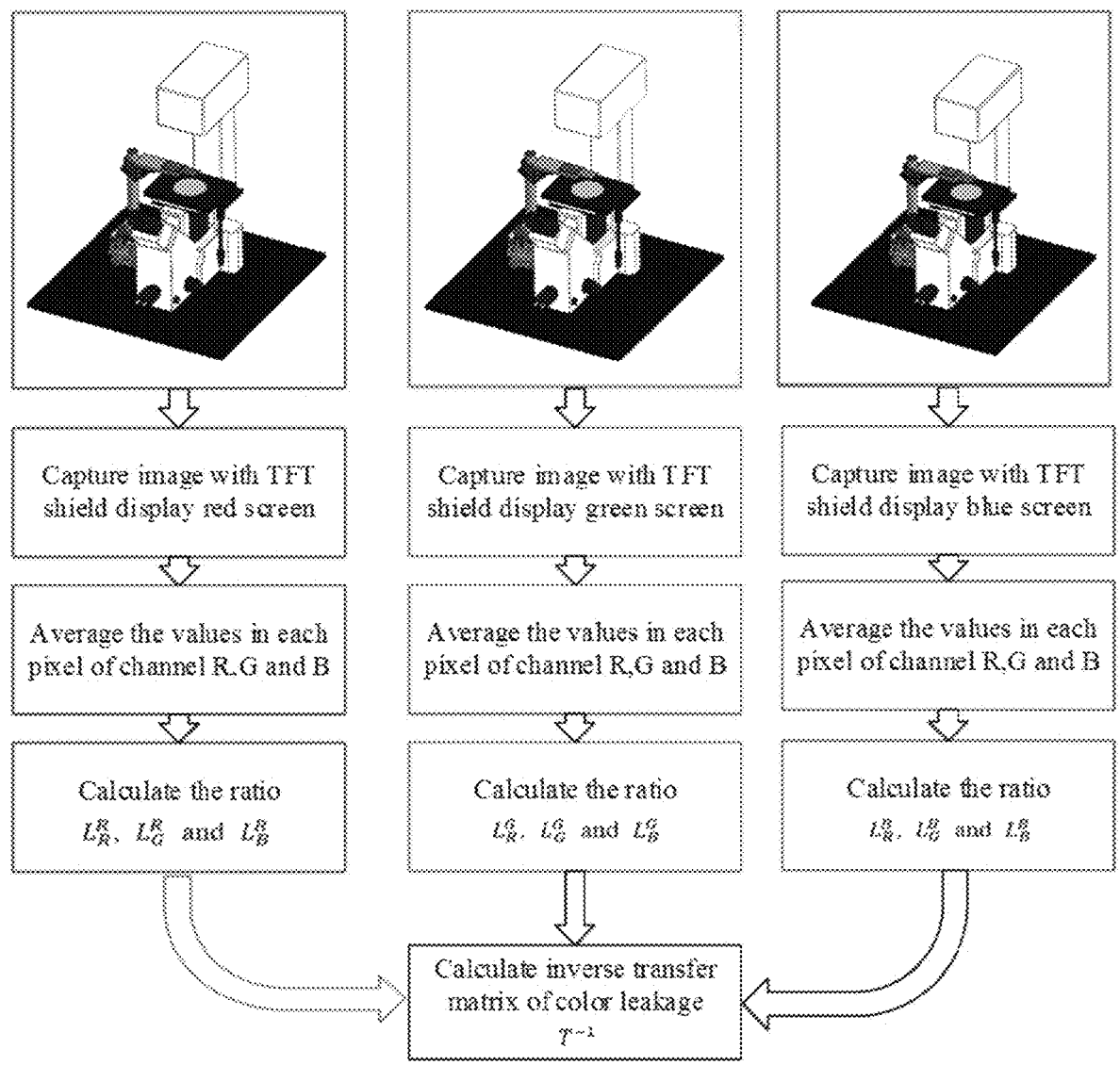
FIG. 26 shows a flow chart of measurement for color leakage correction.

FIG. 25 shows experiment setup for color leakage correction. The TFT shield displaying red screen and was placed in the path of the light to the objective lens. So the objective lens will get the light filtered by TFT shield and image was captured by the camera of inverted microscope. Calculate the average intensity in each pixel of channel R, G and B of the image. Then the leakage ratios $L_R^R$, $L_G^R$ and $L_B^R$ could be obtained. These leakage ratios means how many red light from TFT shield will be detected by the channel R, G and B of color camera. The summation of these ratios is 1. To get the rest color leakage ratio, just repeat the measurement with green and blue screen displayed on TFT shield. The flow chart of measurement for color leakage correction is shown at FIG. 26.

The measured transfer matrix of color leakage of the purposed system is:

$$T = \begin{bmatrix} L_R^R & L_R^G & L_R^B \\ L_G^R & L_G^G & L_G^B \\ L_B^R & L_B^G & L_B^B \end{bmatrix} = \begin{bmatrix} 0.8430 & 0.2513 & 0.0443 \\ 0.1127 & 0.5032 & 0.2454 \\ 0.0443 & 0.2454 & 0.6645 \end{bmatrix}. \quad (5.1)$$

The color leakage problem has great influence and cannot be ignored. The red and blue light from TFT shield has about 16% and 30% intensity leaking to other two channel of color camera. The color leakage percentage of green light from TFT shield even reaches 50%. This is because the spectrum of green light is between spectrum of red and blue light, it will have larger portion overlap with other spectrums in color camera.

By multiplying $T^{-1}$ with images captured by color camera. The influence of color leakage can be largely reduced. Furthermore, the intensity of red, green and blue light also can be normalized by it. The calculated inverse transfer matrix of color leakage $T^{-1}$ is:

$$T^{-1} = \begin{bmatrix} 1.2735 & -0.7181 & 0.1680 \\ -0.2991 & 2.6483 & -1.0490 \\ 0.0256 & -0.9303 & 1.8811 \end{bmatrix}. \quad (5.2)$$

The measurement for color leakage correction only need to be apply once in each system. By color leakage correction, reconstructed images with higher quality could be calculated.

System Verification by Using Color Gradient Pupils to Measure Standard Polybeads The ability of our approach, with 2-axis measurements using a color gradient asymmetric amplitude patterns to obtain quantitative phase imaging, was first verified by imaging microspheres with a diameter (D) of 10 μm (17136-5, Polysciences). The microspheres are immersed in a solution and placed between a cover glass and a glass slide. The index $n_b$ of the beads is 1.58, and the index of the surrounding solution $n_s$ is 1.54.

In our measurement, bright field (BF), dark field (DF), differential phase contrast DPC, 1- and 2-axis quantitative differential phase contrast (QDPC) images of microspheres are shown in Table 4.1. With only one color picture, BF, DF, DPC and 1-axis QDPC could be obtained. BF image was obtained by adding up the intensity in channel red and blue. DF image was obtained by extract the intensity in channel green. And DPC and QDPC was obtained by calculating with the intensity in channel red and blue. QDPC images not only enhances image contrast but also gives quantitative phase information which is shown at the right-hand side inset using grayscale, directly indicating optical thickness of microspheres.

Figure 27:
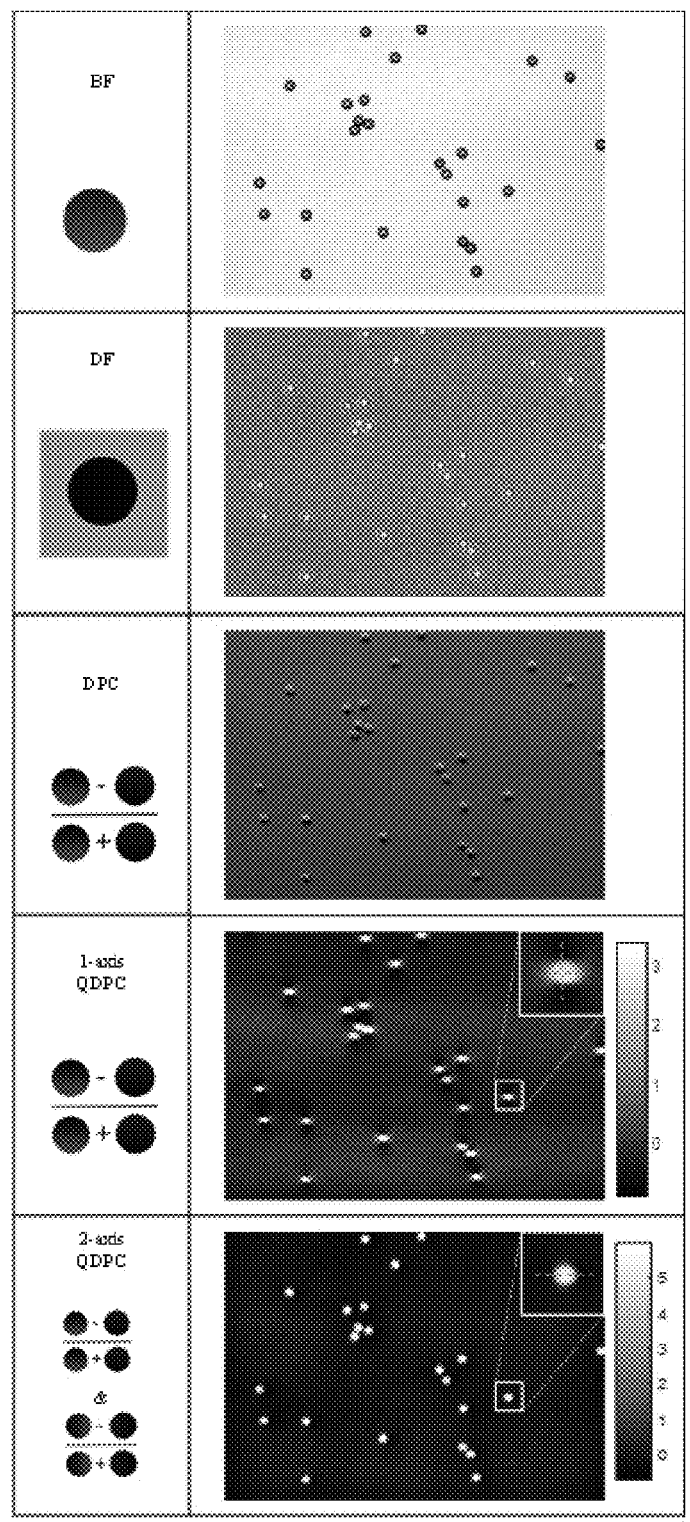
FIG. 27 shows images of microspheres using our 2-axis measurements approach.
Figure 28:
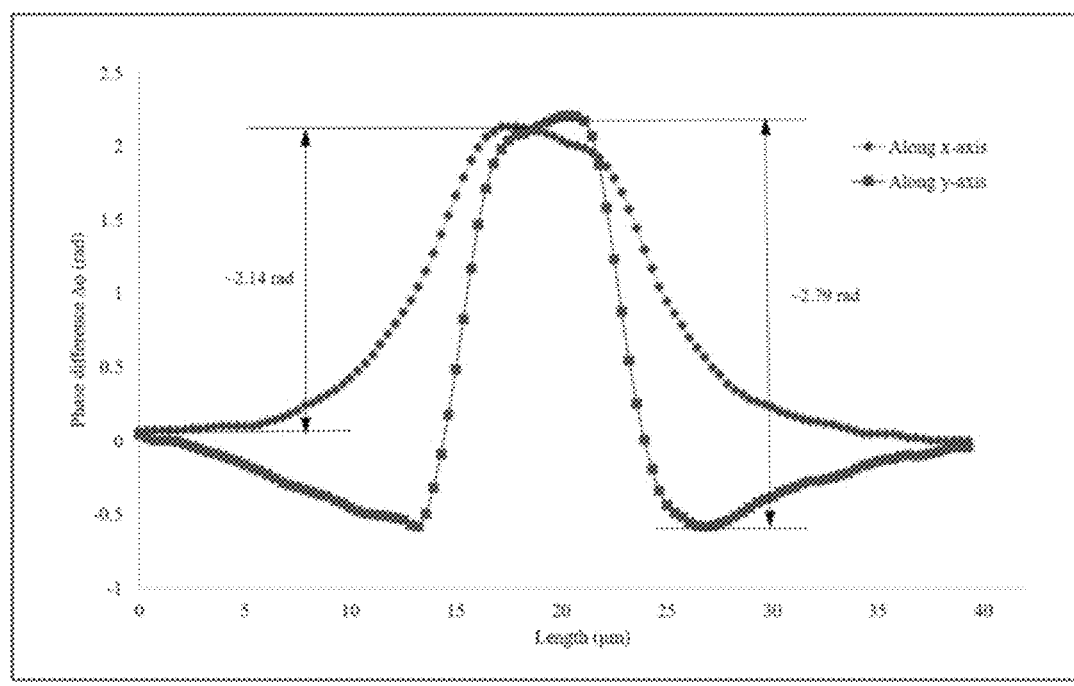
FIG. 28 shows the phase distribution along the dashed line of a zoomed-in microsphere at the highlighted box region of 1-axis QDPC image in FIG. 27.

FIG. 27 shows images of microspheres using our 2-axis measurements approach. FIG. 28 shows the phase distribution along the dashed line of a zoomed-in microsphere at the highlighted box region of 1-axis QDPC image in FIG. 27. The cutline along the measurement axis (y-axis) is in blue, and the cutline perpendicular to measurement axis (x-axis) is in red. The recovered result is deeply influenced by angles. This anisotropic reconstruction result is due to missing frequency of the QDPC transfer function with 1-axis measurement.

Figure 29:
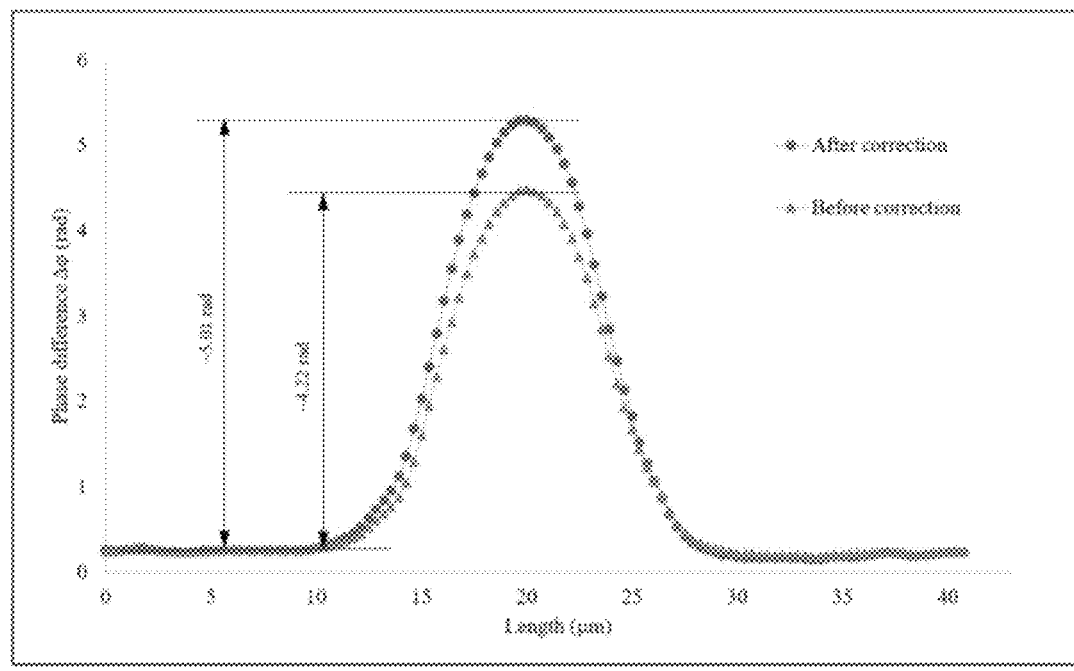
FIG. 29 shows comparison of phase distribution along the dashed line of a zoomed-in microsphere at the highlighted box region of 2-axis QDPC image before and after color leakage correction.

FIG. 29 further compares phase recovery of microspheres using the color gradient pupil before and after color leakage correction. Cutline without color leakage correction is in brown, cutline after color leakage correction is in green. There is a difference of 19% between those two phases values with and without color leakage correction. Because the quantitative value is deeply affected by color leakage. The color leakage must be applied to get accurate reconstructed results.

Figure 30:
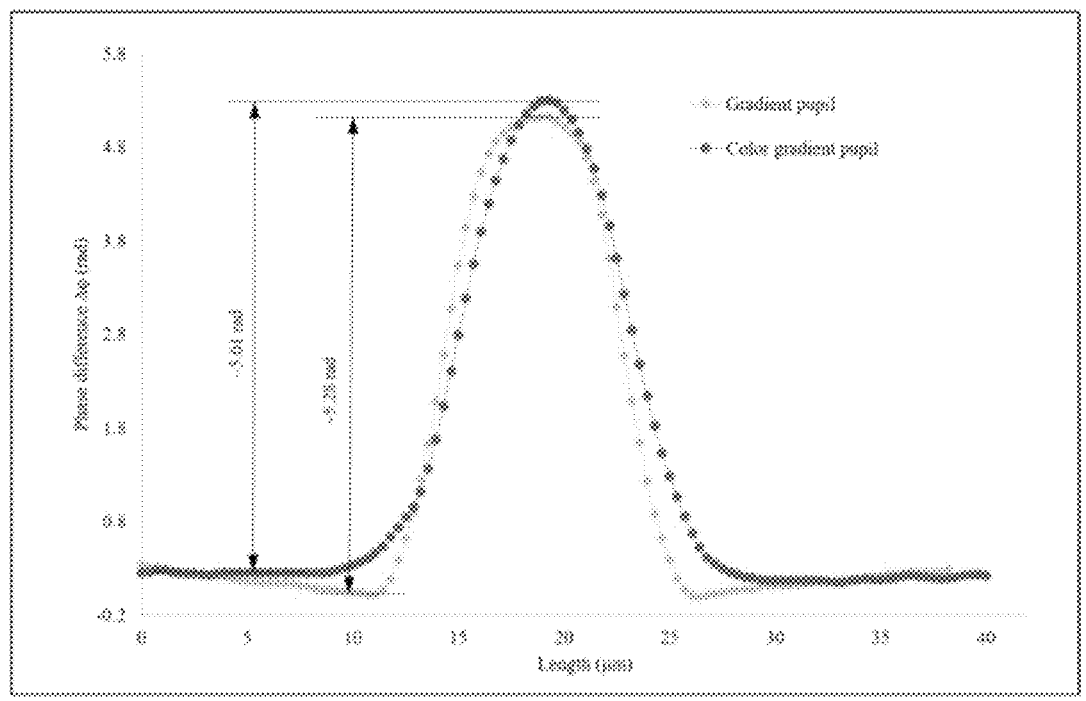
FIG. 30 shows Comparison of phase distribution along the dashed line of a zoomed-in microsphere at the highlighted box region of 2-axis QDPC image by gradient pupil and color gradient pupil.

FIG. 30 shows a comparison of phase distribution along the dashed line of a zoomed-in microsphere at the highlighted box region of 2-axis QDPC image by gradient pupil and color gradient pupil. There is only a difference of 5% between those two phases values using color gradient pupil and gradient pupil. This error may cause by the wavelength used in calculation. While using color gradient pupil, the wavelength is assumed to be the average wavelength of red and blue spectrum. Even so, the error is still very small and negligible.

Therefore, using the color gradient asymmetric pupil with 2-axis measurement, the approach significantly enhances phase recovery in more stable, and accurate fashion.

Our measured phase value is 5.01, while the estimated phase value $$\left( \Delta \phi = \frac{2\pi D(n_b - n_s)}{\lambda} \right)$$

is 4.72 rad. The difference between estimated and measured phase is ~6%, which may be due to uncertainties of the size of microspheres, and refractive index values of microspheres and surrounding solution.

System Verification by Using Multi-Wavelength Radially Asymmetric Pupils

We first calibrate the proposed system by measuring the phase distribution of polystyrene microspheres image (size=10 µm, $n_b$=1.59, 17136-5, Polysciences). The microspheres are immersed in the index matching oil ($n_s$=1.54) and placed between a microscope coverslip and a glass slide. By using Tikhonov regularization, we can solve the quantitative phase image of microspheres acquired by our system after color leakage correction and the results are shown in FIG. 31.

Figure 31A:
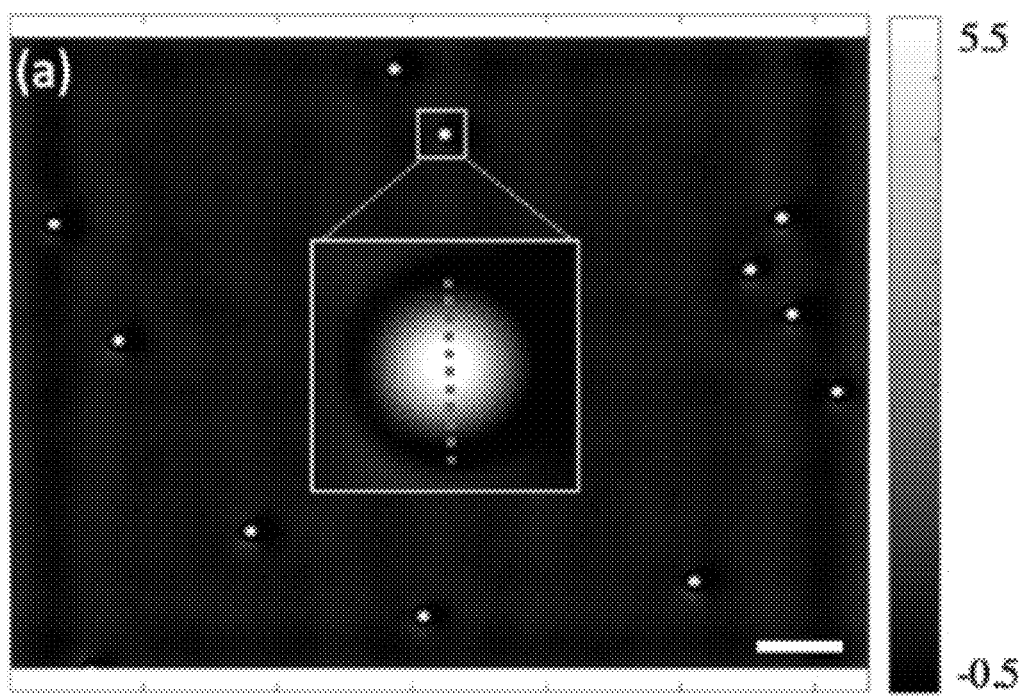
FIG. 31A shows quantitative phase image of microspheres reconstructed by the system with color leakage correction.
Figure 31B:
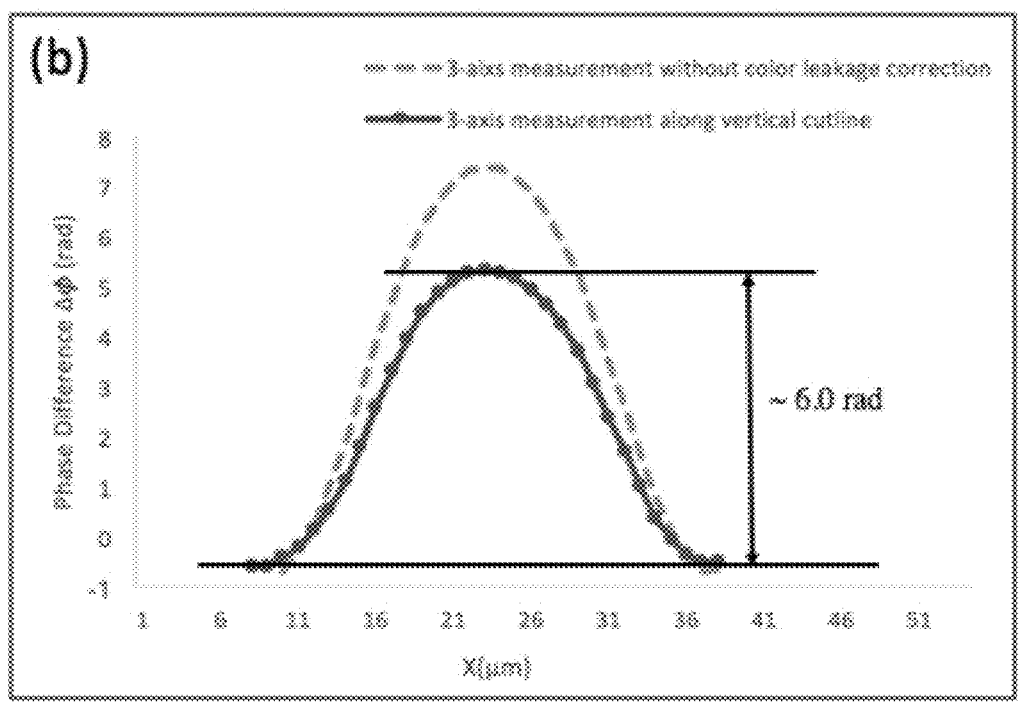
FIG. 31B shows Measured phase distribution of the cross-section along the dashed line of a zoom-in microsphere in FIG. 31A with and without color leakage correction.

FIG. 31A shows quantitative phase image of microspheres reconstructed by the system with color leakage correction. FIG. 31B shows measured phase distribution of the cross-section along the dashed line of a zoom-in microsphere in FIG. 31A with and without color leakage correction. The scale bar is 50 µm.

As we can clearly see, isotropic phase distribution of microspheres can be obtained by our method. The phase distribution along the dashed line of a zoomed-in microsphere at the highlighted box region in FIG. 31A is shown as a blue solid line in FIG. 31B. The inset of the gray scale bar indicates optical thickness of microspheres. Experimentally measured phase value of microsphere is 5.92 rad at a wavelength of 0.52 µm, while the calculated phase value $$\left(\Delta\phi = \frac{2\pi D(n_b - n_s)}{\lambda}\right)$$

is 6.04 rad, which are in the good agreement. The difference between calculated and measured phase is 1.9%, which may be due to uncertainties of the size of microspheres and refractive index variation between microspheres and surrounding medium. However, without color leakage correction, the phase delay shown as an orange dashed line in FIG. 31B was measured to be 8.35 rad, which corresponds to 38.2% more than the calculated phase value. By applying color leakage correction, phase measurement error can be reduced about 36%. As a result, we can conclude that with the process of color-leakage correction, the discrepancy of phase accuracy can be significantly improved.

Figure 32A:
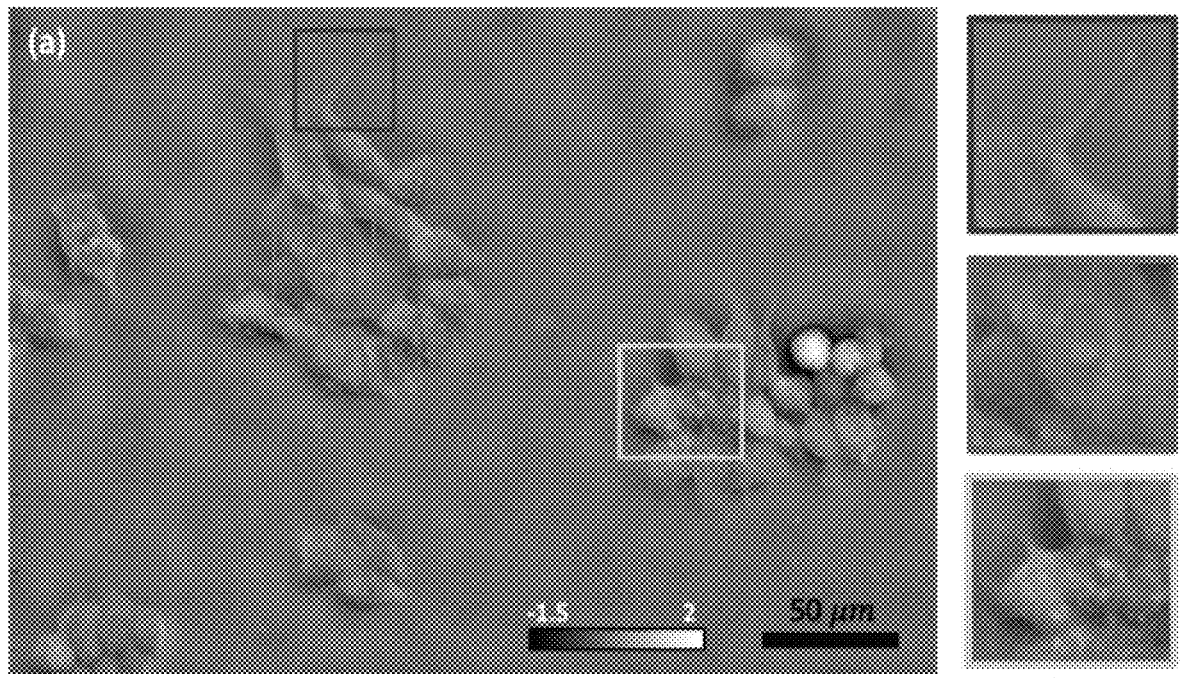
FIG. 32A and FIG. 32B show quantitative phase image of live breast cancer cells using MW-iDPC system.
Figure 32B:
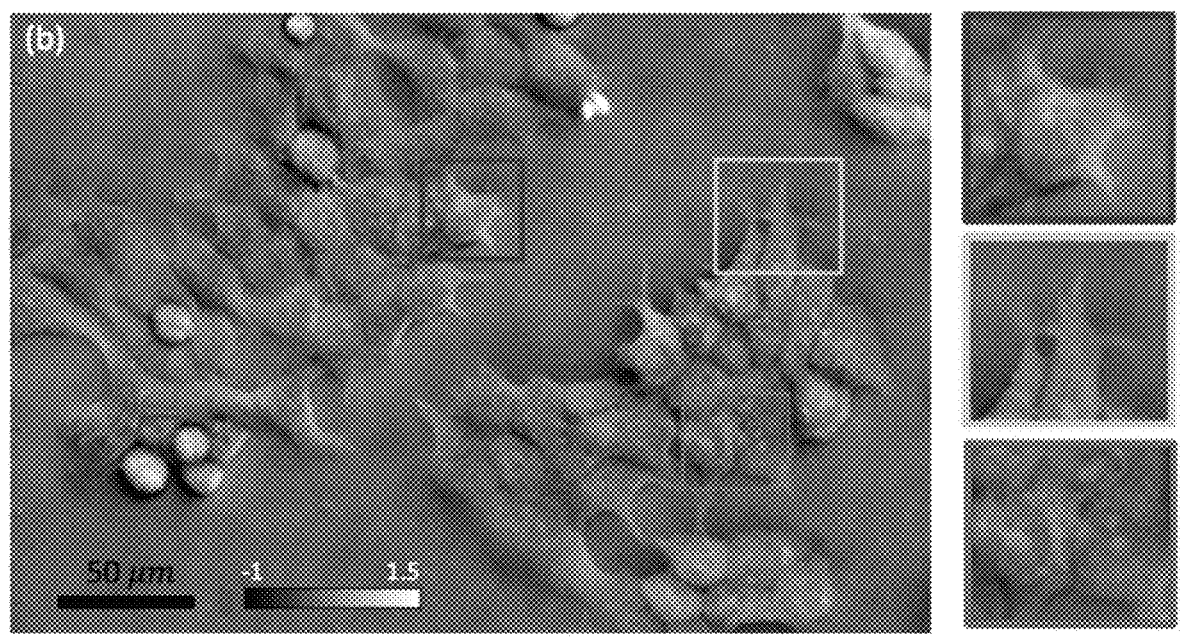
Figure 32C:
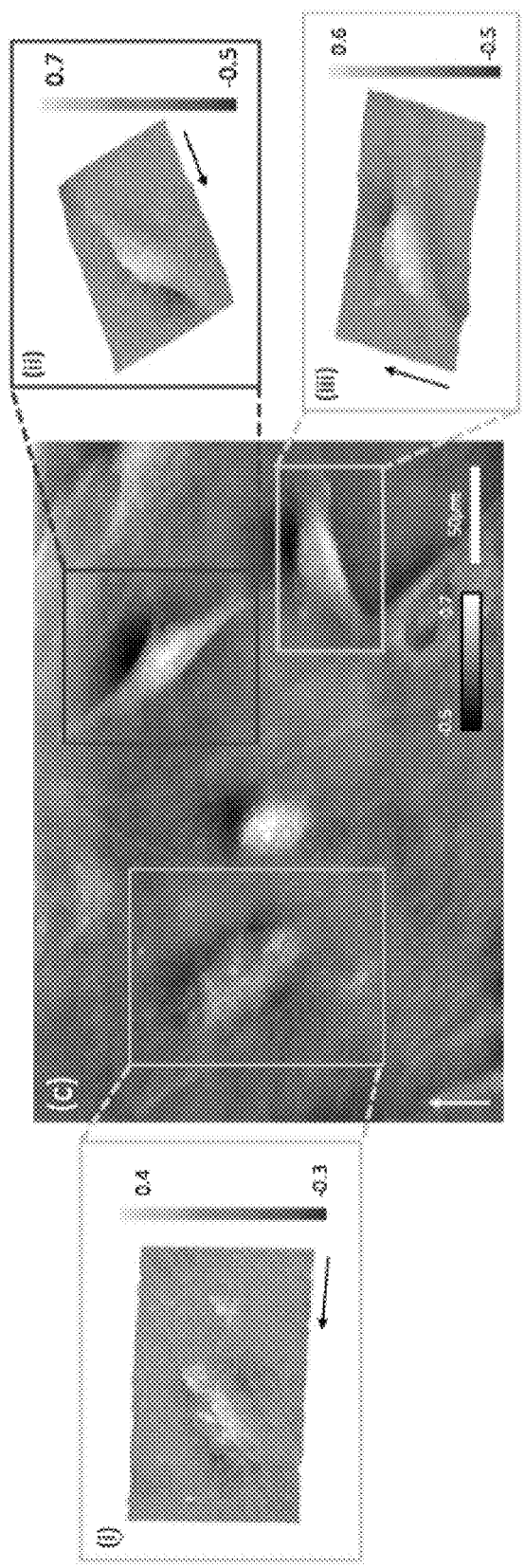
FIG. 32C shows live hair follicle dermal papilla cells with corresponding three-dimensional visualizations (i-iii) of particular cells highlighted in the solid color boxes on the reconstructed iDPC image.

Furthermore, we have applied our system to observe phase structures of live biological samples. FIG. 32A and FIG. 32B show the constructed quantitative phase images of live breast cancer cells with the resultant zoomed-in images of the solid boxed highlighted regions corresponds to different colors. FIG. 32C shows live hair follicle dermal papilla cells with corresponding three-dimensional visualizations of particular cells highlighted in the solid color boxes on the reconstructed iDPC image. The detailed information of live cells is clearly observed, and the color bar in gray scales represents quantitative phase recovery of the cells.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A system for quantitative differential phase contrast microscopy with an isotropic transfer function, the system comprising:
   a light source module, the light source module generating a detection light field constituted by a plurality of color lights, the plurality of color lights comprising a first color light and a second color light, the first color light being a color light with a gradient distribution of increasing intensity along a first axial direction towards a first direction, the second color light being a color light with a gradient distribution of increasing intensity along the first axial direction towards a second direction opposite to the first direction;
   a condenser, the condenser positioned at one side of the light source module, the condenser receiving the detection light field and refracting the detection light field to generate an off-axis light field to project to an object for generating an object light field, the off-axis light field projecting beyond the first axial direction;
   an objective lens, the objective lens positioned at one side of the condenser opposite to the light source module and the object positioned on a focal plane of the condenser, and the objective lens receiving the object light field;
   an image capturing module, the image capturing module coupled to the objective lens, wherein the image capturing module receives the object light field and generates a first color image and a second color image each corresponding to the first and second color lights; and
   an operation processing unit, wherein the operation processing unit performs a differential phase contrast calculation to the first color image and the second color image for reconstructing depth information of a surface of the object;
   wherein the light source module comprises a broadband source and a light intensity modulator, the light intensity modulator is positioned on a Fourier plane of the condenser, the light intensity modulator receives a broadband light generated by the broadband source and modulates the broadband light into the detection light field constituted by the first color light and the second color light.

2. The system of claim 1, wherein through a controlling signal generated by the operation processing unit, the light source module changes a direction of the first axial direction to form a second axial direction, the first color light is a color light with a gradient distribution of increasing intensity along the second axial direction towards a third direction, the second color light is a color light with a gradient distribution of increasing intensity along the second axial direction towards a fourth direction opposite to the third direction.

3. The system of claim 2, wherein the light intensity modulator is a liquid crystal module for controlling a light penetration intensity or a liquid crystal on silicon (LCoS), the light intensity modulator comprises a liquid crystal unit for changing an amount of light penetration according to the controlling signal.

4. The system of claim 1, wherein the condenser has a first numerical aperture (NA) value, the objective lens has a second numerical aperture (NA) value, a ratio of the first and second NA values is 1 or approximately 1.

* * * * *